Nov. 14, 1950     J. E. FREEHAFER     2,529,601

FLIGHT CALCULATOR FOR AIRPLANES

Filed Nov. 12, 1947     6 Sheets-Sheet 1

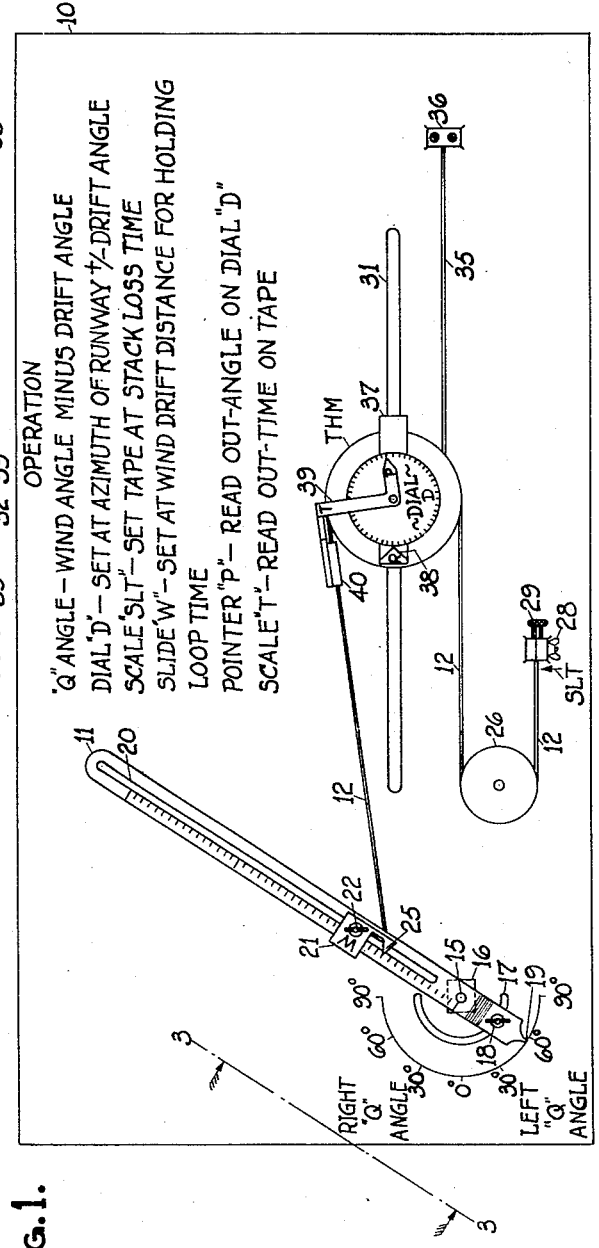

OPERATION

"Q" ANGLE – WIND ANGLE MINUS DRIFT ANGLE
DIAL "D" – SET AT AZIMUTH OF RUNWAY ± DRIFT ANGLE
SCALE "SLT" – SET TAPE AT STACK LOSS TIME
SLIDE "W" – SET AT WIND DRIFT DISTANCE FOR HOLDING LOOP TIME
POINTER "P" – READ OUT-ANGLE ON DIAL "D"
SCALE "T" – READ OUT-TIME ON TAPE

INVENTOR.
J. E. Freehafer,
BY Neil W. Preston,
his ATTORNEY

Nov. 14, 1950 J. E. FREEHAFER 2,529,601
FLIGHT CALCULATOR FOR AIRPLANES
Filed Nov. 12, 1947 6 Sheets-Sheet 2
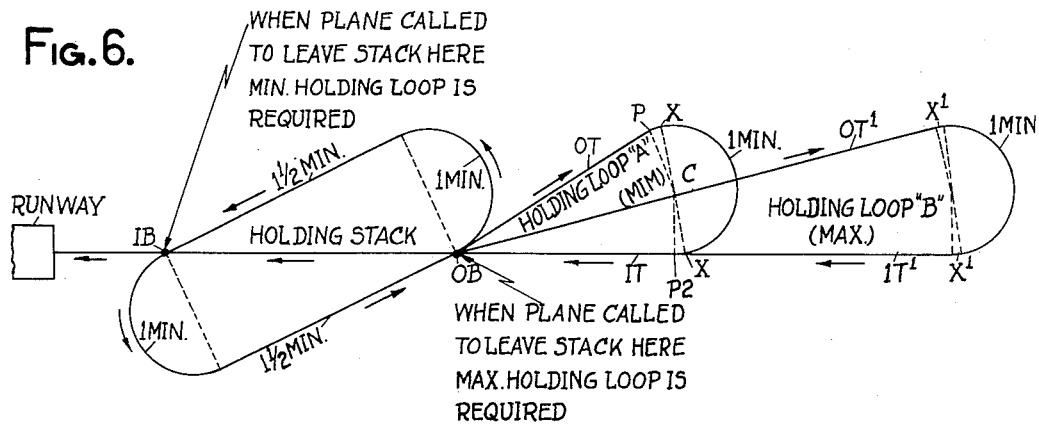
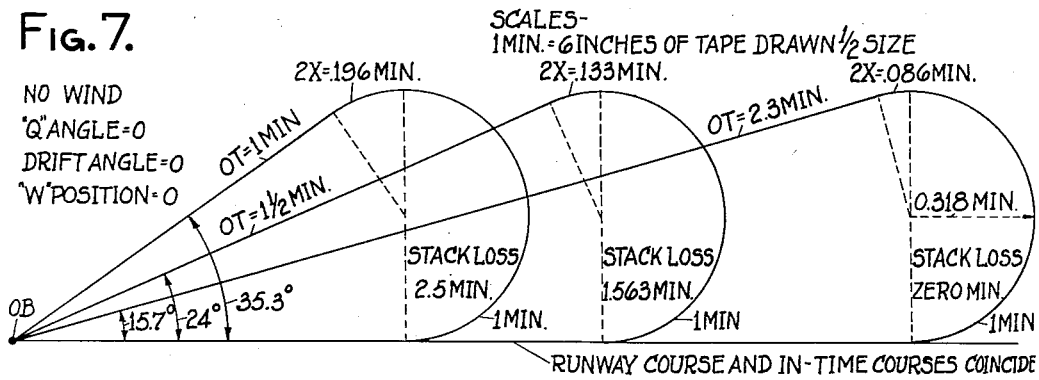
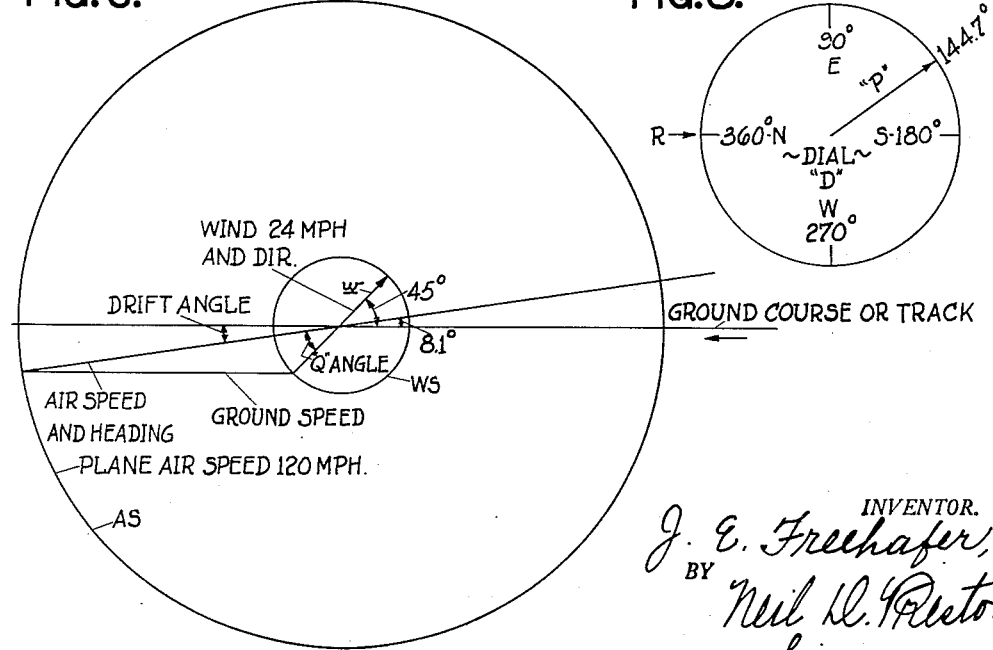
INVENTOR.
J. E. Freehafer,
BY Neil D. Preston,
his ATTORNEY Nov. 14, 1950 — J. E. FREEHAFER — 2,529,601
FLIGHT CALCULATOR FOR AIRPLANES
Filed Nov. 12, 1947 — 6 Sheets-Sheet 3

Fig. 15.
LEFT WIND
STACK LOSS TIME = 2.196 MIN.

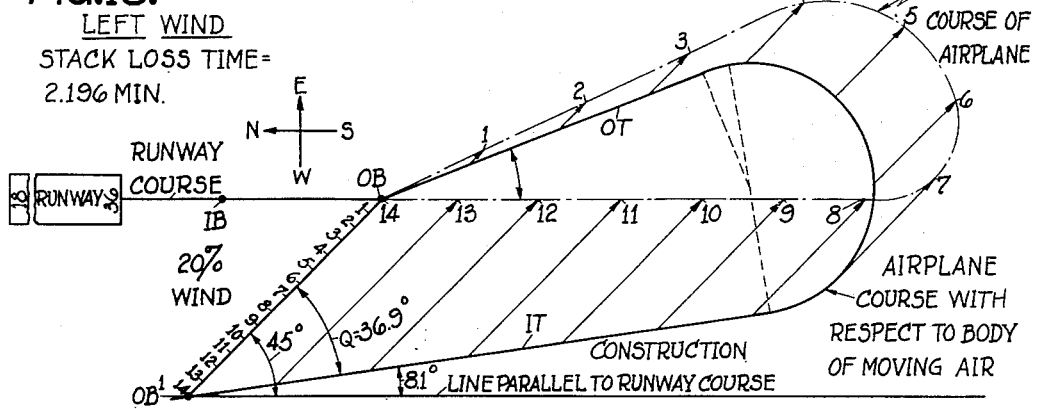

Fig. 16.
RIGHT WIND
STACK LOSS TIME = 2.196 MIN.

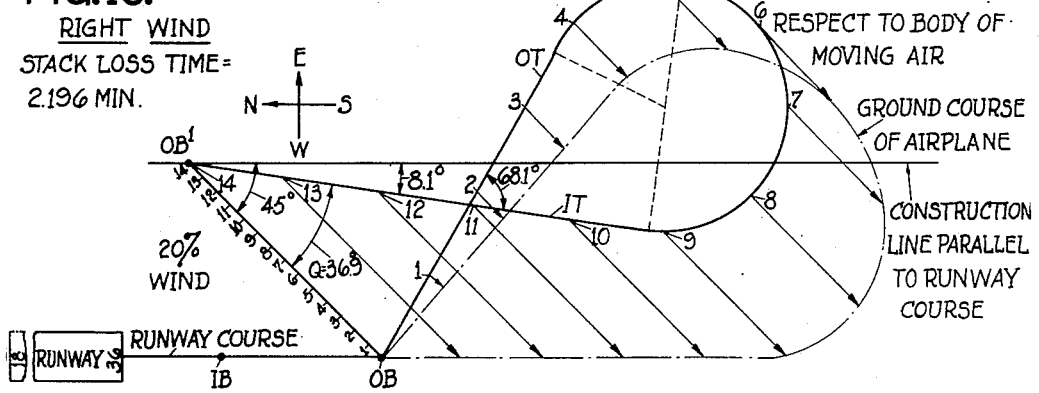

Fig. 10.

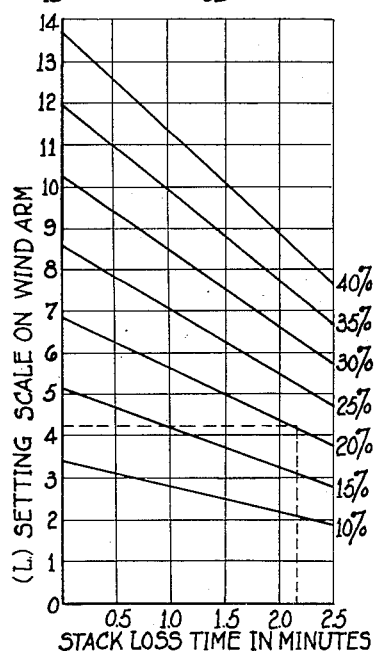

$L$ = LENGTH OF ARM
$c$ = CONSTANT (SUCH AS 6 INCHES/MIN.)
$w$ = WIND SPEED
$u$ = PLANE SPEED
$t$ = HOLDING LOOP TIME
$T$ = TOTAL TIME
$t_1$ = STACK LOSS TIME $T = t + t_1 = 5.696$ MIN.

$$L = c\left(\frac{w}{u}\right)t$$
OR
$$L = c\left(\frac{w}{u}\right)(T - t_1)$$

INVENTOR.
J. E. Freehafer,
BY Neil W. Preston,
his ATTORNEY

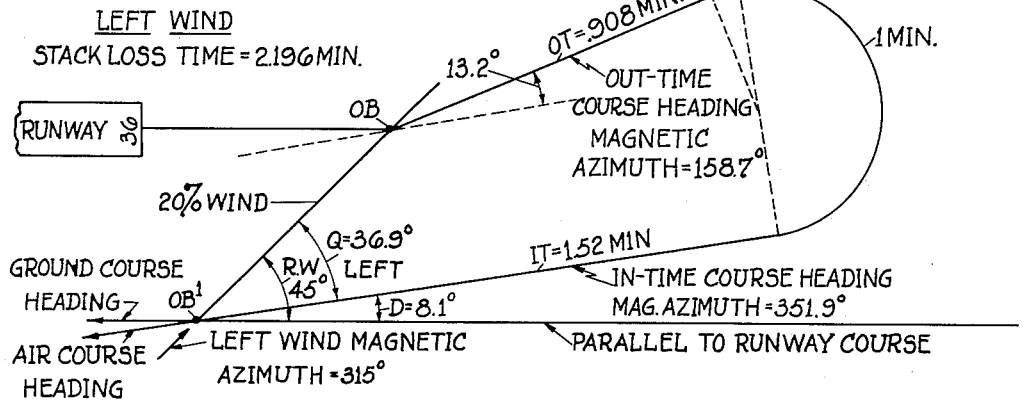
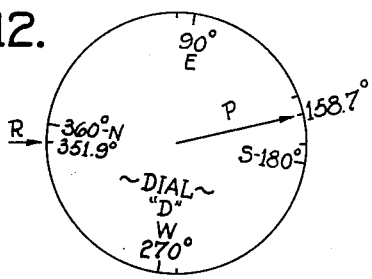
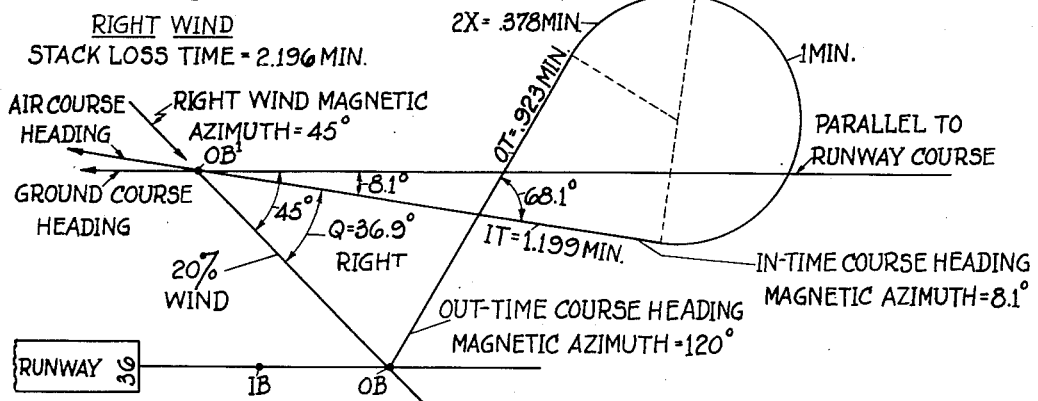
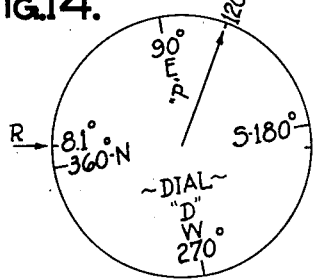

Nov. 14, 1950         J. E. FREEHAFER         2,529,601
FLIGHT CALCULATOR FOR AIRPLANES
Filed Nov. 12, 1947         6 Sheets-Sheet 5
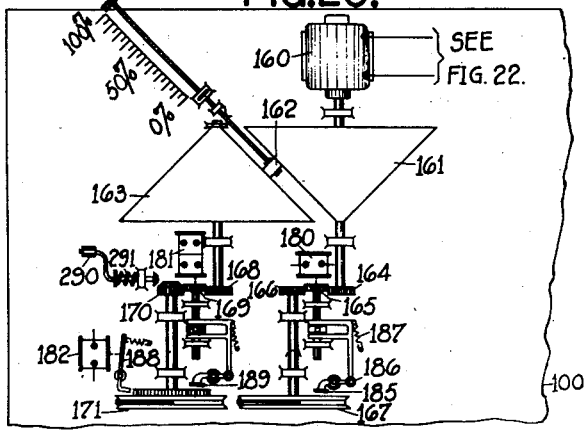
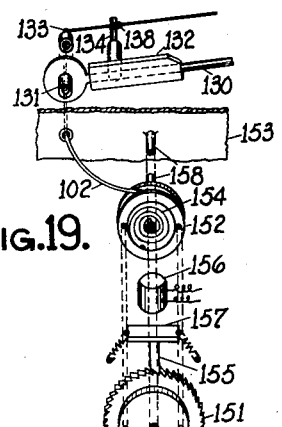
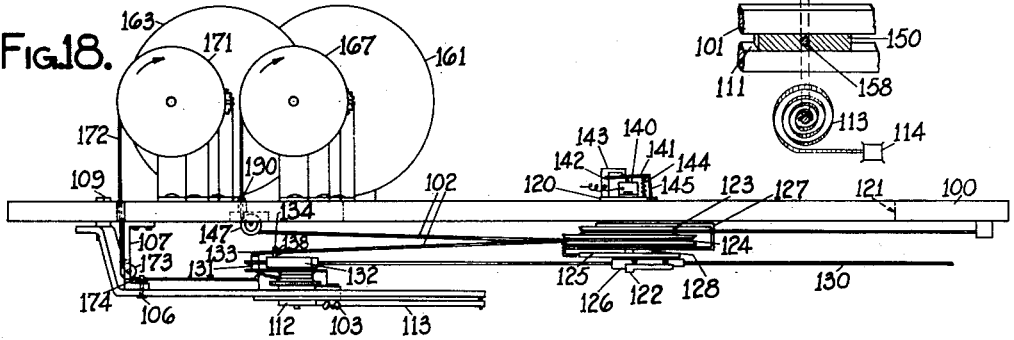
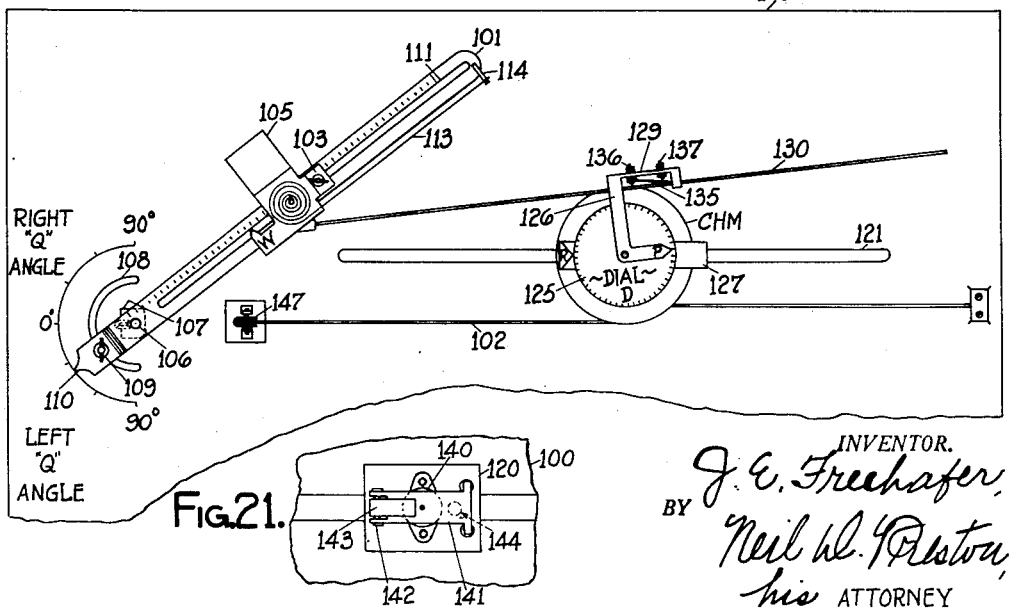
INVENTOR.
J. E. Freehafer
BY Neil W. Preston
his ATTORNEY Nov. 14, 1950     J. E. FREEHAFER     2,529,601
FLIGHT CALCULATOR FOR AIRPLANES
Filed Nov. 12, 1947     6 Sheets-Sheet 6
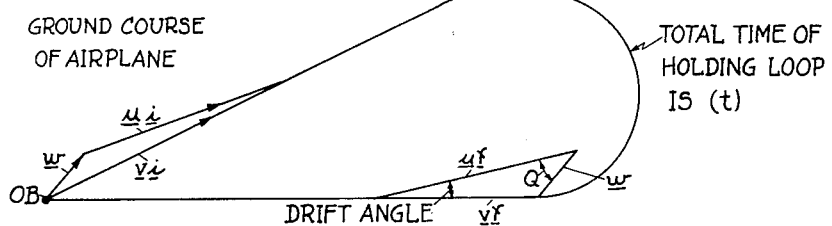
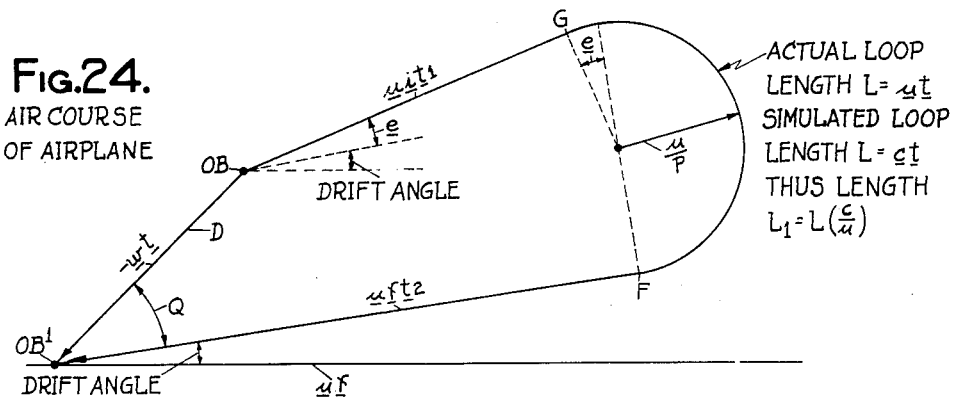
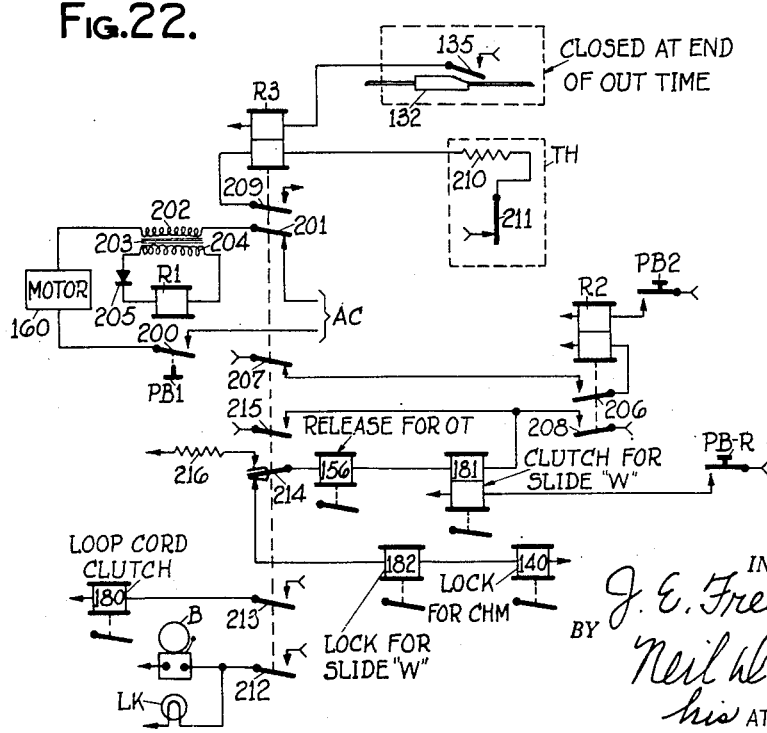

Patented Nov. 14, 1950

2,529,601

UNITED STATES PATENT OFFICE 2,529,601

FLIGHT CALCULATOR FOR AIRPLANES

John E. Freehafer, Rochester, N. Y., assignor to General Railway Signal Company, Rochester, N. Y.

Application November 12, 1947, Serial No. 785,422

16 Claims. (Cl. 235—61)

1

This invention relates to calculating organizations for computing the time and direction that an airplane must fly under various conditions to consume different specified times in a landing procedure, and more particularly pertains to a computer based on a moving coordinate system correlated to a fixed coordinate system.

This invention is to be considered in the nature of an improvement over the disclosures in the prior applications of Saint Ser. No. 569,335 filed December 22, 1944, now Patent No. 2,495,139, and also the prior application of Field, Wight and Hewes Ser. No. 573,876 filed January 22, 1945, now Patent No. 2,522,029.

When a number of airplanes approach an airport ready to land at the same time, these airplanes are assigned to different altitudes of a storage or holding stack near an airport, and are then instructed to land one at a time at spaced intervals. In other words, the airplanes are held in a stack with each one flying at a different altitude. The controller instructs the airplane in the lowest altitude of the stack to begin a landing procedure, which instructions are followed by successive instructions directing the remaining airplanes to each descend to the next lower altitude of the stack as soon as the next lower altitude is vacant. In this way, the airplanes are laddered down in the stack so as to bring the airplanes successively to the lowest altitude to perform landing procedures one at a time at spaced intervals.

It will be apparent that the controller is unable to know the exact location of an airplane in the lowest altitude of the holding stack when he instructs it to make a landing procedure. For this reason, it is practically impossible for a controller to cause the airplanes to land at equally spaced intervals to obtain the greatest landing efficiency even though he may call or instruct the airplanes to land at equally spaced intervals.

In accordance with the present invention, it is proposed that the landing procedure for each airplane shall include the flying of a holding loop having a length dependent upon the time that it took such airplane to leave the holding stack following the reception of its instructions to perform a landing procedure. Thus, if successive airplanes are instructed at equally spaced intervals to perform their landing procedures, then the actual landings will occur at equally spaced intervals. This is because each landing procedure includes a variable length holding loop which compensates for the loss of time due to the location that the airplane occupied in the holding stack when receiving instructions to land.

One object of the present invention is to provide a computer for calculating the time and the direction that an airplane must fly for a holding loop in the above described landing procedure under any given conditions, which computer is organized on mathematically accurate postulates, and performs its operations by apparatus giving mathematically correct solutions.

It is readily apparent that different wind conditions will prevail at different times, so as to make it necessary to provide a calculating organization which takes into consideration such wind conditions in a manner to give accurate calculations of the direction and times involved. Thus, another object of the present invention may be said to reside in the provision of simple and accurate means for taking into consideration the various conditions of windage. Generally speaking and without attempting to define the exact nature of the present invention, this last named object is effected by the provision of a computer which takes advantage of two separate coordinate systems of calculations, one of which is fixed and the other of which moves with the body of air in which an airplane is flying.

Another object of the present invention resides in the provision of apparatus to automatically compute the times and directions involved in a holding loop after the basic factors involved have been set into the apparatus in part manually and in part automatically.

Other objects, purposes, and characteristic features of the present invention will be in part obvious from the accompanying drawings and in part pointed out as the description of the invention progresses.

In describing the invention in detail, reference will be made to the accompanying drawings in which like reference characters designated corresponding parts through out the several views, and in which:

Fig. 1 is a front view of one form of a calculator or computer constructed in accordance with the principles of the present invention for calculating the directions and times involved in a holding loop under various conditions;

Fig. 2 is a top view of the computer illustrated in Fig. 1;

Fig. 3 is a fragmentary sectional view of the computer of Fig. 1 taken on line 3—3 of Fig. 1;

Fig. 4 is a fragmentary view of the tape winding mechanism taken on lines 4—4 of Fig. 2;

Fig. 5 is an enlarged view of the tape and the scale thereon as seen in its position at which it is read to give the calculated out-time;

Fig. 6 illustrates one form of landing procedure pattern with which the present invention may be employed;

Fig. 7 is a graphic illustration of different holding loops under no-wind conditions;

Fig. 8 is a diagrammatic illustration of the dial D in the position to which it should be positioned for no-wind conditions illustrated in Fig. 7;

Fig. 9 is a graphic illustration of one manner of calculating a drift angle for a particular wind condition;

Fig. 10 is a chart for use in connection with setting the wind slide W both in Fig. 1 and in Fig. 17;

Fig. 11 is a graphic illustration of a holding loop under a 20 percent left wind with a stack loss time of 2.196 minutes;

Fig. 12 is a diagrammatic illustration of the dial D in the position to which is should be positioned for the particular wind conditions illustrated in Fig. 11;

Fig. 13 is a graphic illustration of a holding loop under a 20 percent right wind with a stack loss time of 2.196 minutes;

Fig. 14 is a diagrammatic illustration of the dial D in the position to which it should be positioned for the particular wind conditions illustrated in Fig. 13;

Fig. 15 is a graphic illustration showing the relation between the course of an airplane in the moving body of air relative to the ground course for that airplane under the wind conditions illustrated and discussed in connection with Fig. 11;

Fig. 16 is a graphic illustration showing the relation between the course of an airplane in the moving body of air relative to the ground course for that airplane under the wind conditions illustrated and discussed in connection with Fig. 13;

Fig. 17 is a front view of a second form of a calculator or computer constructed in accordance with the principles of the present invention for calculating the directions and times involved in a holding loop under various conditions with certain automatic features of operation not disclosed in connection with Fig. 1;

Fig. 18 is a top view of the computer illustrated in Fig. 17;

Fig. 19 is an enlarged and expanded view of certain parts included in the wind slide mechanism 105 of Figs. 17 and 18;

Fig. 20 is a partial back view of the computer panel illustrated in Figs. 17 and 18, showing more particularly the driving mechanism;

Fig. 21 is a fragmentary back view of the electromagnetic brake for the cord holding mechanism of Figs. 17 and 18;

Fig. 22 is a diagrammatic illustration of control circuits suitable for the computer structure ilustrated in Figs. 17 through 21; and Figs. 23 and 24 represent respectively the ground course and air course of an airplane, which courses correspond to those illustrated in Fig. 15, but which have applied thereto the system of notation employed in the mathematical analysis of the flight problem involved.

*Holding stack and holding loops*

With reference to Fig. 6 of the accompanying drawings, it will be observed that a runway has been indicated to the left of a "holding stack" defined by suitable inner and outer beacons IB and OB respectively. These beacons are assumed to be of any suitable type, but are preferably radio beacons which are in line with each other and the landing runway in such a way that an airplane in approaching the runway from the right, will be able to properly locate the landing runway and employ the glide path provided by suitable apparatus associated therewith. In other words, the present invention contemplates that its highest usefulness will be in connection with the directing of airplanes in landing procedures that are to be effected while flying blind due to adverse atmospheric conditions.

The holding loop A designated by a suitable legend in Fig. 6, is formed by straight lines connecting the outer beacon OB with a standard procedure turn or semicircle. This holding loop A, is the minimum sized holding loop, while the holding loop B is the maximum sized holding loop, it being understood that the holding loop for any particular flight may be of some intermediate size dependent upon the stack loss time for that particular flight. For the purpose of the present disclosure, it is assumed that the diagram represents flying times rather than distances, which can be done since a standard speed must be selected for the various airplanes expected to use the holding stack and associated holding loops, and this selected speed must be maintained constant throughout a landing procedure. With these assumptions the semi-circular portions of the holding stack are assumed to consume one minute flying time each (i. e. three degrees per second), while each of the straight legs of the holding stack are assumed to consume one and one half minutes flying time. It should also be understood that an airplane may enter a selected altitude of the holding stack from an associated airway at any point in the holding stack.

It is contemplated that each of the different runways of an airport will have suitable inner and outer beacons IB and OB associated therewith so as to provide a holding stack for that runway when the wind conditions require use of that runway.

Airplanes are assumed to fly in the holding stack and in the holding loops as indicated by suitable arrows in the diagram in Fig. 6. If an airplane is called from the holding stack while it is passing over the inner beacon IB, it continues its course around the stack by making the one minute semi-circular procedure turn and then passes over the outer beacon OB. When the airplane passes over the outer beacon OB, the pilot of the airplane reports to the controller who then through the medium of the calculating apparatus provided in accordance with the present invention advises the pilot as to his heading. The airplane then proceeds at constant speed at the given heading and after a given time, conveniently termed the out-time represented by the line between OB and P, which is also calculated by the computer of the present invention, the controller instructs the pilot to begin a right hand procedure turn which is of the same type as the procedure turn of the holding stack i. e., three degrees per second. The pilot of the airplane continues on the procedure turn, until his airplane comes onto a line defined by the outer beacon OB and inner beacon IB at which time he proceeds on that straight line from the point P2 toward the runway as directed by the beacons. It will be noted that the procedure turn from the point P to the point P2 is slightly greater than a semicircle, and the excess consitutes two equal segments X. The semicircle is defined by a diameter drawn through C and perpendicular to the line OB—C. Lines C—P and C—P2 are perpendicular to the tangent lines OB—P and OB—P2 respectively.

For convenience it is assumed that the out-time OT and the in-time IT represented by the straight lines of the holding loop A are equal to one minute, and that they are tangent to the procedure turn which includes a standard one minute semicircle plus the two segments X. The holding loop A, which is the minimum holding loop for reasons later to be explained, thus includes five parts consisting of a straight run of out-time OT, a circling time X, a one minute semicircular turn, another circling time X, and a straight run of in-time IT. The total holding loop time is thus three minutes plus a time designated as 2X. The calculation of the time X, expressed in minutes, can be readily shown to amount to 0.098 minute so that 2X equals 0.196 minute of flying time.

Since the angle subtended by the arc X is equal to the angle P—OB—C, because two angles whose sides are mutually perpendicular are either equal or supplementary, then the time arc X may be calculated as follows:

The tangent of the angle X is therefore equal to the radius of the circle $$\frac{1}{\pi}$$

divided by the value of OT or 0.318/1, which equals 0.318. Knowing the tangent value, we find that it represents an angle of 17° 39′. This angle is equal to 0.3083 radians. When the radians .3083 are multiplied by the radius of the circle (i. e. 0.318), we find that X is equal to 0.098. Therefore, 2X is equal to 0.196 minute.

From the above calculation we then know that the length of the selected minimum holding loop A is 3.196 minutes.

If an airplane is called to leave the holding stack at the inner beacon IB, the maximum amount of time is lost in getting out of the stack i. e. the time loss before passing over the outer OB. This requires the use of the minimum holding loop A just calculated. On the other hand, if an airplane is called to leave the stack while passing over the outer beacon OB, then there is no time lost in leaving the stack. However, if two airplanes are successively called at the inner and outer beacons as just considered with a given time spacing between such calls, then the difference between the stack loss times must be compensated for in the holding loops in order to provide that the two airplanes may pass over the outer beacon in proceeding towards the runway at the same time spacing as provided between the successive calls. In other words, the stack loss time for one airplane plus its holding loop time must equal the stack loss time of another airplane plus its holding loop time. Since the stack loss time will vary depending upon the point in the holding stack at which an airplane is called, it is apparent that the holding loops will be of different lengths.

Therefore, when an airplane is called to leave the holding stack at the outer beacon OB, then the holding loop will be a maximum, and this is represented in Fig. 6 by the holding loop B. This maximum holding loop B is then equal to the maximum stack loss time plus minimum holding loop time, which, with the values above assumed, gives a maximum holding loop B having a time of 5.696 minutes.

Referring to Fig. 6, it will be observed that the maximum holding loop B includes the standard one minute semicircle but the values of the arcs $X^1$ are not known. The out-time $OT^1$ and the in-time $IT^1$ are likewise unknown. However, by calculation it will be found that with a maximum holding loop of 5.696 minutes, the value of $X^1$ will be 0.043 and that the out-time will be 2.305 minutes, which of course is the same as the in-time IT.

If an airplane is called from the holding stack just after passing the outer beacon OB and while it is still on the procedure circle, it continues the procedure circle (or turn) until it again passes over the outer beacon OB to enter a holding loop. The stack loss time in this case may vary approximately from one minute to two minutes.

On the other hand, the airplane may be flying the straight portion of the holding stack after passing the outer beacon OB, in which case it immediately makes a left hand procedure turn and then proceeds toward the outer beacon OB to enter a holding loop. The stack loss time in this case may vary approximately from one minute up to two and a half minutes. This latter figure is of course the maximum stack loss time which occurs when the airplane is called while passing over the inner beacon IB.

If the airplane is called any time after passing the inner beacon IB, it continues on the holding stack course until passing over the outer beacon OB into a holding loop. The stack loss time in this case may vary from zero to two and a half minutes, the zero value occurring when the call is made while the airplane is passing over the outer beacon OB.

From the above description, it will be readily apparent that there will be a large number of different stack loss times and consequently correspondingly different holding loop times. Likewise, the heading of an airplane for the out-time course of a holding loop will be different for each different length holding loop. For this reason, the present invention proposes to provide a calculating organization which will accurately give the out-time value and also the out-time course heading for each of the different holding loops. It is also apparent from the above description that the holding loops may be determined by the value of the stack loss time because a standard holding loop has been selected as a basis for the required calculations. However, in this connection it should be understood that the time values assumed are to be considered merely typical of the values that might be selected.

*Structure of primary computer shown in Figs 1 through 5.*

In these figures, a primary form of computer has been disclosed embodying the principles of the present invention. Following the description of this primary form and its functioning, a secondary form having certain automatic features, will be described in detail as also embodying the principles of the present invention.

The computer of these figures comprises a support panel 10, a Q angle setting arm 11, a flexible tape 12, a wind setting slide 21, a stack loss time setting means SLT, a spring biased tape holding mechanism THM, and a setting dial D. The various operating parts, presently to be discussed in detail, are shown mounted on the face of the panel 10 merely for convenience and illustration. It should be understood that various different designs of apparatus may be employed, and suitable arrangements may be provided for covering the moving parts with only the necessary dials and adjusting means open to the view of an operator. Also, on this panel in a suitable free space is the abbreviated operating rules for using the computer.

The Q angle setting lever 11 is pivoted by a suitable pin 15 entering the support member 16 as best seen in Figs. 1 and 3. This support member 16 is a U-shaped piece securely mounted to the panel 10. A circular slot 17 is provided in the panel 10 to receive a bolt 18 with an enlarged head in back of the panel 10 and a thumb nut in such a way as to be movable through the slot 17 while the thumb nut is loosened, but adapted to hold the Q angle lever in any position in which it is set when the thumb nut of the bolt 18 is tightened.

On the face of the panel 10 around the circular slot 17, and around a semicircle inscribed by the pointer 19 at the end of the Q angle lever, a scale of degrees is provided. The center point of this scale is designated zero and represents the point to which the arm 11 is set when there is no wind conditions to enter into the calculations. The remaining portions of the scale on either side of the zero point are calibrated in equally spaced degree marks up to 90° to complete the semicircle. These degrees represent the right and left values of the Q angle which is found as will be later described, but which on the opening chart is briefly defined as the wind angle minus the drift angle. The wind angle is the acute angle between the direction of the ground course on the approach to the runway and the reciprocal of the wind direction. The drift angle is the acute angle between the direction of the ground course and the direction of the axis of the airplane on the approach to the runway in the landing procedure (see Fig. 9).

The Q angle lever is illustrated as having a slot 20 substantially throughout its free end in which is mounted a slidable wind setting member 21 that can be set in any position along the slot 20 and held there when the thumb nut 22 is tightened. Along the face of the lever 11 is a scale calibrated with equal increments beginning from the pivot point 15 and extending outwardly along the free end of the lever 11. The slidable member 21 has a projection 23 which is adapted to have the tape 12 pivotally attached thereto by a suitable pin 24, as best seen in Figs. 2 and 3. The extending portion 23 is adapted to permit the point 24 at which the tape 12 is attached, to be set exactly over the pivot point 15 of the Q angle lever 11 when the slide 21 is in its zero position as indicated by the index or pointer 25 on the zero setting of the scale on the face of the lever 11.

Before discussing the spring biased tape holding mechanism THM and the idler pulley 26, it should be noted that the flexible tape 12 may be of suitable length, but its length as selected, is calibrated in accordance with the maximum holding loop dimensions with which the computer is to be employed. For example, the maximum holding loop selected for the purposes of the present disclosure, is assumed to represent a maximum of 5.696 minutes, and for convenience, it is assumed that six inches of flexible tape are provided for each minute. However, it should be clearly understood that any suitable scale may be employed. That is, one inch of the tape may represent one minute of the holding loop, or any number of inches or fractional portions of inches may be assigned to represent a minute of the holding loop. In any event, and in accordance with the particular scale selected, the length of the tape from the pivot point 24 (when exactly positioned over the pivot point 15) to the read-out of the stack loss time setting means SLT, represents the total holding loop time. Also, in accordance with the same scale of inches per minute of time, the diameter of the supporting pulley or wheel 27 represents a standard two minute procedure turn for an airplane.

Assuming a scale of six inches per minute, then the pulley 27 will have a radius of 1.91 inches inside of its guide flanges. Considering that the tape 12 extends from the point 15 over the pulley 27 is returned to the point 15, it will be seen that the tape then represents to a time scale the actual maximum holding loop (assuming the mechanism THM to be in its right hand biased position), as above described in connection with Fig. 6. But it is inconvenient structurally to return the tape 12 to the pivot point 15, so that an idler pulley 26 is provided to cause the tape 12 to leave the pulley 27 on a tangent line passing through the point 15, but so that the end of the tape can pass through a stack loss time setting means SLT. The stack loss time setting means SLT comprises a tape holding device including a thumb nut 28 which may be tightened to clamp the tape 12 for holding it, or which may be loosened to permit the tape 12 to be moved to a different position by the handle piece 29 attached to the end of the tape, and also a read-out which is indicated by the arrow and is conveniently referred to as stack loss time read-out SLT.

The tape holding mechanism THM includes a bearing and support member 30, which will freely slide in the slot 31, and is maintained in position by reason of suitable guide portions on each side of the member 30. This member 30 is rectangular so as to be non-rotatable. This slot 31 is parallel to a line drawn from the center 15 tangent to the pulley 27, and in part defined by the tangent portion of the tape 12. An extending shaft 32 is attached to slide member 30 and has a coil spring biasing pulley 33 mounted thereon. This pulley 33 is mounted on the pivot 32 to rotate, but when rotated in a counter clockwise, it is biased against such rotation by a suitable coil spring 34. On the outer periphery of this pulley 33 is attached a flexible cord or tape 35 which is wound around the pulley and attached to the panel at point 36. Thus, if the tape 12 is shortened, the holding unit THM is moved to the left tightening the spring 34. But if the tape 12 is lengthened, the spring 34 tends to wind up the cord 35 and move the holding unit THM to the right to keep the tape 12 tight and also to properly position the pulley 27 representing the standard procedure turn of a holding loop and mounted on the shaft 32.

Extending around these two pulleys 27 and 33 on one side is a holding member 37 which serves to support the outer end of the shaft 32 and carries a pointer 38 designating the relative position of a dial D which is pivotally mounted on the shaft 32 and is manually positionable to represent the azimuth of the run-way plus the drift angle in a manner later to be discussed. When positioned, the dial D is held by a spring biased retention means 44. In other words, this dial D has a scale around its circumference divided into equal increments representing 360°.

An angle indicating member 39 is pivoted on the shaft 32 with an extending pointer P attached to provide readings from the scale of the dial D. The upper portion of this member 39 is bent so as to cover a portion of the tape as viewed in Figs. 2 and 5 to provide a read-out designated by a suitable arrow and the letter T from which the out-time may be read from the tape 12. This extending portion of the member 39 has a U-shaped extension 40 which passes around the tape 12 in such a way that the pointer P is moved to different angular position in accordance with the angle at which the tape 12 enters the pulley 27. The read-out at T thus provides a value on the scale of tape 12 which falls at the point of tangency of the tape 12 on the pulley 27. The pointer P is parallel to the line of tangency formed by the tape 12.

The upper side of the tape 12 has a scale indicated thereon having increments representing time (see Fig. 5). This scale has its zero at the point 24 and runs up to a value slightly greater than the maximum out-time required.

The underside of the tape 12 has a scale indicated on it with increments also representing time. This scale has its zero at the stack loss time read-out SLT when the tape is positioned to represent the maximum holding loop as above described. The scale increases from zero along the tape up to a value to represent the maximum stack loss time, which for the values assumed is equal to 2.5 minutes.

It should be noted that the wind slide W may be moved to any point along its scale, and in some cases may assume its outer position at the same time that the lever 11 is moved to a ninety degree right Q angle. Since the idler pulley 26 must be sufficiently to the left with respect to the location of the tape holding mechanism THM to provide proper tangency for the tape 12 when the tape holding mechanism THM is moved to its extreme left hand position, it is necessary for the tape 12 between point 24 and pulley 27 to be in a different plane than the outer surface of the idler pulley 26 under the wind conditions above mentioned. This is possible because the idler pulley 26 is off set as seen in Fig. 2 to allow for such an operation.

*Operation of primary computer*

Let us assume that there is no wind. Under such conditions, there are certain settings of the computer that are fixed and may be made before an airplane is to be called from the holding stack. More specifically, the lever 11 is set to designate a Q angle of zero. Also, the wind slide member W is moved to its zero position. The dial D is set with respect to the pointer R to designate the azimuth of the landing runway.

We may now assume that an airplane is called from the holding stack (see Fig. 6) while passing over the inner beacon IB. The airplane continues to fly the holding stack course so as to pass over the outer beacon OB before proceeding to fly a holding loop pattern. The pilot of the airplane reports while passing over the beacon OB, so that the controller by using a suitable watch, or other timing device, may determine the elapsed time between the initial call for the airplane to leave the holding stack and the time that the airplane reports passing over the outer beacon OB. This elapsed time is conveniently termed the stack loss time. The controller now operates the computer of Fig. 1 to obtain the out-time of the holding loop and also to obtain the magnetic azimuth of such out-time course. Thus, all that is necessary to be done when the stack loss time is known, is to loosen the thumb nut 28 and move the handle 29 so as to move the flexible tape 12 until the stack loss time read-out SLT designates the particular stack loss time for that particular flight. In the present case, the stack loss time would be two and one half minutes. Since the stack loss time has been set into the computer, the out-time may be read from the tape at the read-out T, while the magnetic azimuth of the out-time course may be read from the read-out P on the dial D. With the conditions assumed, the out-time will be one minute, while the out-time course forms an angle of 35.3 degrees with respect to both the in-time course and the runway course, since these two courses coincide when there is no wind. This holding loop for these conditions has been illustrated in Fig. 7.

Assuming the runway course to extend north and south with the landing of the airplane being made towards the north, the azimuth of the runway will be 360 degrees (N), so that the magnetic azimuth of the out-time course will be 144.7 degrees, as read from the dial D at the read-out P. This setting of the dial D and the position of the pointer P has been illustrated in Fig. 8. This particular setting of the calculator is for a holding loop which corresponds to the minimum holding loop A described in connection with Fig. 6.

With reference to Fig. 7, it will be noted that a holding loop has been diagrammatically indicated for a stack loss time of 1.563 minutes. In other words, the positioning of the handle 29 so as to move the flexible tape 12 to give a stack loss time read-out of 1.563 at the read-out SLT, allows the tape holding mechanism THM to move to the right as seen in Fig. 1, causing the pointer P to move to a new position and the read-out T to give a new out-time. In this case the out-time will be 1.5 minutes and the out-time course angle with respect to the runway course and in-time course will be 24 degrees. The magnetic azimuth of the out-time course is thus 156 degrees.

Likewise, Fig. 7 illustrates the holding loop when there is no stack loss time which is set into the calculator at the read-out SLT. This gives an out-time of 2.3 minutes and an out-time course angle of 15.7 degrees with respect to the in-time and runway courses. Assuming the same settings for the dial D we find that the magnetic azimuth of the out-time course is 164.3 degrees.

From the above description and typical examples, it will be readily understood that the setting of any given stack loss time at SLT will give a proper holding loop so that the corresponding out-time may be read from the read-out OT, and the pointer P will give the magnetic azimuth for the proper out-time course belonging to such holding loop. Obviously, there are just as many different holding loops as there are different stack loss times varying from zero to two and one half minutes for the particular values assumed.

In still air, the lapse of time and the distance of movement of the airplane vary directly with each other because the speed of flight is assumed to be constant throughout the landing procedure. Because of this relationship between time and distance, the contour of the flexible tape for a particular setting represents in miniature the actual flight course of the airplane both with respect to the ground and with respect to the body of air through which it is flying even though the length of the tape 12 is considered to represent time.

When an airplane is flying under wind conditions, it is flying in a body of air with respect to which it has a particular contour of flight; but since the body of air is moving with respect to the ground, such contour of flight is also moving with respect to the ground. This produces a distinctly different contour of flight with respect to the ground. It should be apparent that if a given circular course is to be traveled by an airplane with respect to the ground, that such course will not be circular with respect to the moving body of air. Similarly, if an airplane is to fly a circular course with respect to the moving body of air, such course will not be circular with respect to the ground.

The present invention is based upon the provision of a moving coordinate system considered with respect to the moving body of air which moving coordinate system is properly related to the stationary ground coordinate system. With this as a basis, it is possible to simulate and calculate the actual flight course in air under wind conditions because such course is geometrically simple; and this simulation and calculation of the course in the moving body of air can be used to give the actual magnetic headings and time values involved when properly correlated to the fixed ground coordinate system. The primary computer of Fig. 1 has the flexible tape 12 positioned to simulate the air course of the airplane with respect to the moving body of air; and this air course is related to the ground coordinate system through the setting of dial D, which involves the calculation of the drift angle for the airplane with given wind conditions.

The process of calculating a drift angle is well known, and may be facilitated by the use of simple computers such as shown in the prior patents to Prall. No. 1,428,449, Colvin No. 1,910,093 or Thurston 2,296,692. However, for the purposes of making the present disclosure complete, Fig. 9 illustrates one manner of calculating a drift angle. For the purposes of this illustration, it is assumed that there is a wind having a speed equal to twenty per cent of the air speed of the airplane and a direction forming a forty-five degree angle with the ground course or runway. This wind direction is shown as a wind coming from the left of the airplane ground course. For a wind coming from the right of the airplane ground course, the construction of Fig. 9 would merely be reversed.

Referring to Fig. 9, the direction and velocity of the moving air body is indicated vectorially by the vector $w$ forming a 45° angle with the ground course, and the magnitude of this vector $w$ is the radius of a wind speed circle WS. The air speed of an airplane is represented by the radius of an air speed circle AS. By drawing a line parallel to the ground course from the point where the negative wind vector $-w$ intersects the circle WS, and then drawing another line from the center of the circles to the point where such parallel line intersects the air speed circle AS, it is possible to thus produce a vector diagram giving the ground speed over the ground course and also giving the proper heading of the airplane to following the ground course. This heading angle is known as the drift angle of the airplane with respect to the ground course. For the purposes of the drift angle calculation shown in Fig. 9, it is assumed that the wind speed is twenty per cent of the air speed of the airplane, as for example, the wind speed may be 24 miles per hour when the cruising speed of the airplane is 120 miles per hour. It should be understood however, that the vectors assume the same positions and the same relative magnitudes so long as the ratio between the two speeds remains the same. In the particular drift angle calculation shown in Fig. 9, the drift angle is found to be 8.1°, while the Q angle (which is the wind angle minus the drift angle) is found to be 36.9°.

When the drift angle has been determined, it is set into the computer of Fig. 1 by moving the dial D to the azimuth of the runway plus or minus the drift angle depending upon whether the wind is coming from the right or from the left with respect to the ground course of the airplane toward the runway. When the wind is coming from the left of the ground course, the drift angle is subtracted from the azimuth of the runway as illustrated in Fig. 12, which shows the dial D enlarged to illustrate the typical setting just explained. On the other hand, if the wind is coming from the right of the ground course, then the dial D is set so that the drift angle is added to the azimuth of the runway as typically shown in Fig. 14.

As above explained, the calculation of the drift angle, as in Fig. 9, also gives the Q angle which is set into the computer by loosening the thumb nut 18 and moving the pointer 19 to the proper position for the calculated Q angle. If the wind is from the left side of the ground course, as indicated in Fig. 9, the Q angle is in the lower quadrant designated in Fig. 1 "left Q angle." On the other hand if the wind is from a direction on the right side of the course, the Q angle is in the upper quadrant in Fig. 1 designated "right Q angle."

Let us assume that an airplane is called from the holding stack and proceeds over the outer beacon OB, at which time the pilot reports to the controller. By suitable timing means, the controller determines the elapsed time between his call to the plane instructing it to leave the holding stack, and the time that it reports as passing over the outer beacon OB. The controller then immediately sets this stack loss time into the computer of Fig. 1 at the stack loss time read-out SLT. With a knowledge of the stack loss time and the percentage of the wind velocity, the operator can read from the scale L on the chart of Fig. 10, the setting for the wind slide W. With these settings made, the operator can read the magnetic azimuth of the out-time course from the read-out P on the dial D which the controller immediately transmits to the pilot of the airplane. The controller can also read the out-time from the scale on the tape at the read-out T, which represents the time which should elapse after the pilot reports over the outer beacon OB before he begins his procedure turn. When this out-time has actually elapsed, as measured by a suitable time measuring mechanism, the controller then instructs the pilot of the airplane to begin the procedure turn. The pilot of the airplane proceeds on the procedure turn until the airplane is on a course in line with the ground course to the runway as defined by the outer beacon OB and the inner beacon IB. Because the in-time course IT (see Fig. 11) is tangent to the procedure turn, the airplane has a proper heading when it reaches the point of tangency to follow this in-time course. Since the in-time course is at the drift angle for the particular wind condition, the airplane will thus readily follow the runway course without further calculation of drift angle or the like, and some directly under the controlling guidance of any instrument landing facilities.

As an example of the operation of the computer under left wind conditions, Fig. 11 graphically shows the air course of the airplane assuming a stack loss time of 2.196 minutes and the ratio of wind speed to airplane speed to be twenty per cent. By referring to the chart of Fig. 10, it will be found that for this stack loss time and air speed ratio, the setting of the slide W is 4.2 (indicated by dotted lines in Fig. 10).

As above described, the length of the tape 12 of Fig. 1 represents the time during which the airplane is flying the holding loop. During this same holding loop time, the body of air is moving in a direction assumed in the drift angle calculation of Fig. 9 to be at 45° from the runway ground course. Since the Q angle is set into the computer of Fig. 1, the position of the lever 11 represents the actual direction of the wind with the simulated holding loop assuming a proper relation thereto. Since the movement of the body of air in the direction represented by the position of the lever 11 is at a different speed than the speed of the airplane, the length of the lever employed to represent the air movement must be different than the length of the tape 12 although the position of the slide W also represents a time corresponding to the holding loop time. The distance of air movement bears the same relation to the length of the holding loop as the speed of the wind bears to the speed of the airplane. Thus, the scale position of the slide W is determined by multiplying a constant, such as six inches per minute, by the percentage of wind and the time of the holding loop. This is mathematically indicated by the notations of Fig. 10, while the chart is used to facilitate the actual calculation. Assuming the constant factor of six inches per minute, then the reading 4.2 obtained from the chart of Fig. 10 may be interpreted as 4.2 inches.

Referring to Fig. 11 of the drawings, it will be noted that the holding loop is drawn to show the course of an airplane in a moving body of air. The body of air may be considered to be a wind that is traveling in a direction represented by the arrow designated a "left wind." A point in this moving body of air, such as the point designated OB¹, travels in a direction towards the outer beacon OB during the flight of the airplane through the holding loop. Assuming that the wind has a particular speed relative to the speed of the airplane, then there is some point in the moving body of air that will move toward the outer beacon OB, during the passage of the airplane through the holding loop, and just pass over the outer beacon as the airplane is returning to the outer beacon OB. Assuming a particular ratio between the wind and airplane speeds, such as twenty percent, then the distance that the point OB¹ in the moving body of air travels during the flight of the airplane through the holding loop bears the same relation to the distance through the holding loop as does the speed of the wind bear to the speed of the airplane. In other words, the scalar length of the line between OB¹ and OB represents the time of travel of the moving body of air; while the scalar length of the holding loop (including the out-time OT, 2X, the one minute semi-circle, and the in-time IT) represents the time of the airplane in making the holding loop. Obviously, since the wind is assumed to be travelling at a slower speed than the airplane, the increments of time marked off on the line OB¹—OB, are smaller than the increments of time marked off on the holding loop. This graphic illustration of Fig. 11 has indicated thereon the various values of time, directions and angles involved in a holding loop under the conditions assumed, which values correspond to the values given by the computer when the various assumed settings are placed into the computer.

It is noted that the computer dial D is so set that the in-time represented by the lower portion of the tape 12 (i. e. portion beneath the pulley 27) is in effect positioned in accordance with the magnetic azimuth of the runway course (see Figs. 1 and 12). The out-time course and direction is indicated by the position of the pointer P, so that the degree to which it is displaced from a center line passing through the read-out R gives the angle between the out-time course and the in-time course. But since the actual magnetic azimuth of the out-time course is desired, the drift angle is inserted into the setting of the dial D. Referring to Fig. 11, it will be noted that the ground course heading is in a clockwise position with respect to the air course heading for the in-time course. Thus, it should be apparent that the drift angle should be subtracted from the azimuth of the runway, as shown in detail by the dial setting illustrated in Fig. 12. With the dial D set with the drift angle subtracted from the azimuth of the runway course, the pointer P actually assumes a position giving the magnetic heading of the out-time course with respect to the dial D.

For the purpose of making clear the relation between the moving coordinate system and the fixed coordinate system associated with the ground, Fig. 15 is provided with a graphic illustration of how the ground course may be constructed. In this Fig. 15, the same holding loop shown in Fig. 11 is included as associated with a runway. It might be noted that the designation 36 at the end of the runway means that the contact point for an airplane at that end of the runway is for a ground course having a magnetic azimuth of 360° from due north, or is in fact north. The designation 18 at the end of the runway means that the contact point for a landing airplane at that end of the runway is for a ground course having a magnetic azimuth 180° from due north, or is in fact south.

As above mentioned, the distance between OB and OB¹ is proportional to the length of the holding loop. Since both the holding loop and this line between OB and OB¹ represent time, both the holding loop and the line between OB and OB¹ may be divided into an equal number of time segments. Each time segment of the line OB—OB¹ will represent the same period of time as each time segment of the holding loop, but will have a length bearing the same relation to the length of such segment of the holding loop, as the velocity of the moving body of air holds to the air speed of the airplane. In Fig. 15, the holding loop is divided into fourteen equal time segments. Likewise, the line OB to OB¹ is divided into the same number of equal time segments. Let us assume that an airplane leaves the outer beacon OB and reaches the end of the first segment in the time represented by the length of such segment. Then it will be noted that the moving body of air has moved a distance proportional to the first segment of the line between OB and OB¹, so that the airplane is actually located over the ground at a point along a line parallel to the line between OB and OB¹ a distance from the air course holding loop equal to the length of the first segment of the line OB and OB¹. Similarly, as the airplane proceeds along the holding loop to the end of each of the successive segments marked off on the holding loop, the airplane is actually over the ground at a point represented by a distance away from the represented holding loop corresponding to the distance represented by the end of the correspondingly numbered segment of the line OB—OB¹. These different points connected by a dot-dash line represent the actual ground course of the airplane. This Fig. 15 illustrates that the airplane in making its right-hand procedure turn, follows a course which is circular with respect to the moving body of air, but which is not a true circle with respect to the ground. Also, the airplane in following the air course is given accurate information in accordance with the computer of the present invention so that as it performs the procedure turn and comes into line with the outer and inner beacons OB and IB, it has the proper heading to proceed on a straight ground course to reach the runway. In other words, the ground course for the runway is tangent to the procedure turn, and the pilot of the airplane does not have to compute a drift angle for the in-time course because the airplane is properly headed for the then existing conditions of the wind. This would not be true if the runway course was not an exact tangent to the procedure turn.

As an example of the operation of the computer under right wind conditions, Fig. 13 graphically shows the course of the airplane in the moving body of air assuming a stack loss time of 2.196 minutes and the ratio of wind velocity to airplane speed to be 20 per cent. In other words, the assumptions for the holding loop course of Fig. 11 except that the wind is assumed to be coming from the right side of the ground runway course as the airplane is landing. The position of the slide W remains the same, i. e. in the position 4.2 as obtained from the chart of Fig. 10. In this case the Q angle is 36.9° in the upper quadrant designated "Right Q angle."

By referring to Fig. 13, it will be noted that the "air course heading" for the in-time course is located in a clockwise position with respect to the "ground course heading." This means that a similar relationship should be included in the setting of the dial D, which is effected by adding the drift angle to the azimuth of the runway. Referring to Fig. 14, it is noted that the dial D is thus set to 8.1°.

In considering the holding loop represented in Fig. 13, the procedures with respect to the airplane will be omitted, since the controller and pilot communicate in the same manner as previously described. The computer is further set to the stack loss time of 2.196 minutes at the computer read-out SLT. With these settings in the computer, the read-out T gives an out-time OT of .923 minute; while the pointer P gives a magnetic azimuth of 120° for the out-time course heading.

In Fig. 13, the values of 2X and the in-time IT are also given in addition to the standard one minute semicircle. The addition of these various times constituting the holding loop, gives a total holding loop time of 3.5 minutes which will be found to be the difference between the total time 5.696 minutes and the stack loss time 2.196 minutes.

It will be noted from the holding loop course illustrated in Fig. 13, that the airplane in proceeding from the outer beacon OB actually performs a course in the moving body of air which crosses itself before the airplane can return to the outer beacon OB for proceeding over the runway course to land. This rather complex appearing air course actually produces a ground course as shown in Fig. 16 which has been constructed on the same principles as described in detail in connection with Fig. 15. Thus, the details of the construction of Fig. 16 will not be given, it being sufficient to note that the ground course of the airplane is of a proper contour to cause the runway course to form a tangent to the procedure turn so that the airplane will have the proper heading when it comes into line with the outer and inner beacons OB and IB for the wind conditions assumed.

Again referring to Fig. 6 of the drawings, it will be noted that the holding loops illustrated are under no wind conditions and are drawn with respect to the ground coordinate system, so that if a holding loop were to be drawn into Fig. 6, which represents the ground course of the airplane under the particular wind conditions assumed for Figs. 11, then the ground course loop of Fig. 15 would be employed. It should be understood that there is a large number of different holding loops corresponding to the different combinations of wind conditions and stack loss times, and obviously all of these different combinations cannot be graphically illustrated in this disclosure. It is thought to be sufficient to give the typical examples described above.

There is one other specific case which may be mentioned although no diagrams are shown for its conditions, and that is when the wind is a direct head-on wind having a direction corresponding to the azimuth of the runway. In such a case, it is apparent that there is no drift angle, and thus the Q angle setting is at zero. However, since there is a wind in the direction of the out-time course, it is apparent that the time for such course will be less than the time required for the in-time course. This is compensated for by the calculator, since the slide W must be positioned in accordance with the percentage of wind velocity compared to the air speed of the airplane. Thus, as soon as the controller knows the stack loss time, it can be set into the computer at the read-out SLT, and from the chart in Fig. 10 the setting of the slide W can be obtained.

The dial D having been set at the read-out R to correspond with the azimuth of the runway, the controller may now read the out-time at the read-out T and the azimuth of the out-time course at the read-out P.

*Structure of secondary computer shown in Figs. 17 through 22*

In these figures of the drawings, a secondary form of computer has been disclosed embodying the same principles of the present invention as disclosed in connection with the primary computer but having certain automatic features to save time and effort on the part of the controller. For example, in this form of the present invention, it is not necessary for the controller to measure the stack loss time, since the computer acts automatically to measure the stack loss time and insert its value into the computing organization. This means that the computer provides the proper azimuth reading as soon as an airplane passes the outer beacon into the holding loop without any operation on the part of a controller. These various automatic features will be presently described in detail.

The secondary computer of these Figures 17 through 22 comprises a support panel 100, a Q angle setting arm 101, a flexible cord or cable 102, a wind percentage setting stop 103, a spring biased and electromagnetic cord holding mechanism CHM, a setting dial D, a wind percentage mechanism 105, and various control and operating devices.

The Q angle setting lever 101 is pivoted at 106 by a suitable pin entering the support member 107 as best seen in Figs. 17 and 18. This support member 107 is a U-shaped piece securely mounted to the panel 100. A circular slot 108 is provided in the panel 100 to receive bolt 109 with an enlarged head in the back of the panel 100 and a thumb nut on the face of the panel in such a way as to be movable through the slot 108 while the thumb nut is loosened, but adapted to hold the Q angle lever 101 in any position in which it may be set when the thumb nut of the bolt 109 is tightened.

Around the circular slot 108 and a semicircle inscribed by the pointer 110 of the Q angle lever 101, a scale of degrees is provided. The center point of this scale is designated zero and represents the point to which the arm 101 is set when there is no wind condition to enter into the calculations (i. e. when there is no drift angle). The remaining portions of the scale on either side of the zero point are calibrated by equally spaced degree marks up to 90°. These degrees represent the right and left values of the Q angle which is found by calculation as described in accordance with Fig. 9, or by other suitable computer means. This Q angle in brief is the difference between the wind angle and the drift angle as previously described in connection with Fig. 9.

The Q angle lever 101 is illustrated as having a slot 111 substantially throughout its length in which is mounted a slidable setting stop 103 which may be manually set in any position so that the normal position of the wind slide mechanism 105 is determined in a manner later to be described. This slide block 103 is separate from the mechanism 105 and may be manually set in any desired position, but the mechanism 105 is considered to be drawn toward the end of the lever 101 and make an abutment against the stop 103 by reason of a spring holding mechanism 112 including a spring 113 fastened at 114 at the end of the lever 101. As will presently be described, the mechanism 105 is at times motor driven so as to be drawn toward the point 106, but when released by the driving mechanism, the spring 113 causes the mechanism 105 to again be drawn against the setting stop 103.

The cord holding mechanism CHM is very similar to the tape holding mechanism THM of Fig. 1. A bearing and support member 120 is adapted to slide within the slot 121 within the panel 100. Non-rotatably mounted to this member 120 is a shaft 122 upon which is mounted the spring biased pulley 123, the cord supporting pulley 124, the dial 125 designated "Dial D" on its face, and the pointer supporting member 126. A holder bracket 127 is also attached to the bearing and support member 120 and extends around the right of the pulleys 123 and 124 as viewed in Fig. 18 and then in back of the dial 125 so as to provide a read-out at R. Suitable spring biased retention means is provided at 128 for the dial 125 so that it will remain in the position to which it is manually set.

The member 126 has attached to it a pointer having P inscribed on its face. A contact holding member 129 is also attached to member 126 and is adapted to hold one end of a rod 130 in such a manner as to allow the rod to slide through its holding support. The other end of the rod 130 is pivoted about a hollow shaft 131 supported by the mechanism 105. In other words, the hollow shaft 131 provides a pivot for rod 130 which is thus held tangent to the pulley 124 with the same angle as the flexible cord 102. A slidable member 132 is adapted to move along the rod 130 in either direction depending upon the movement of the cord 102 around the pulley 124. This is because of the bead attachments 133 and 138. As the bead 133 travels to the right, it comes into contact with the arm member 134 and causes the slide 132 to move along the rod 130 because the bead 133 cannot pass through the eyelet in the arm member 134. This moves the slide into position to push the movable contact 135 upwards as viewed in Fig. 17 so that there is an electrical circuit closed between terminals 136 and 137 at just the time that the bead 133 arrives at the point of tangency between the cord 102 and the pulley 124. As the cord 102 is moved in a counterclockwise direction with respect to the pulley 124, then the bead 138 contacts the eyelet of the member 134 and moves the slide 132 back to its initial position, which movement is limited by the bead 133 coming into contact with the hollow shaft 131.

As best viewed in Fig. 19, the arm member 134 is attached to the upper part of the slide 132 by a sliding connection so that the arm 134 can move in and out to follow the cord. This is necessary because the cord forms a very slight angle between the end of the hollow shaft 131 and the plane of the pulley 124. This arm 134 extends downwardly at its outer end with an eyelet at its lower extremity through which the cord 102 has been passed with the beads 133 and 138 located on its opposite sides. With this arrangement, the beads 133 and 138 can pass over the flanged pulley 124 with the downwardly extending portion of the arm 134 properly following without interfering with the pulley. It should be noted that the arm 134 is sufficiently long to allow for its proper endwise movement. However, the arm 134 has a suitable rectangular cross section so as to be non-rotatably mounted with respect to the slide 132. This is so that the slide will take definite positions with respect to the beads 133 and 138.

At the back of the panel on the bearing and support member 120, is mounted an electromagnetic brake for the cord holding mechanism CHM. This electromagnetic brake includes an electromagnet 140 which acts upon a spring biased armtaure 141 (see Figs. 18 and 21). The armature 141 is pivoted at 142 on a suitable support 143 which also acts as a back stop for the armature 141 in its biased position. The armature is moved to its biased position by reason of a compression spring 144. At the free end of the armature are two extending rods 145 which pass through suitable holes in the bearing member 120 so as to just clear the back face of the panel 100 when the armature 141 is in a deenergized position; but when the armature 141 is actuated to an energized position, these brake members 145 are pressed against the panel 100 to create sufficient friction to prevent sliding movement of the cord holding mechanism CHM in its slot 121 due either to the spring biased pulley 123 or to other operations of the computer.

The percentage wind mechanism 105 as seen in Figs. 17 and 18 has also been illustrated in a double size view in Fig. 19 with the parts shown in expanded relationships to show more clearly the intended operation. The mechanism 105 is mounted on the lever 101 in such a way as to slide in the slot 111. As above mentioned, the spring 113 is suitably attached to the face of the member so as to cause the mechanism 105 to be biased toward the free end of the lever 101. The shaft 158 to which this spring is attached, is non-rotatably mounted to the bearing or slide portion 150 and extends through a notched wheel 151 and a reel 152 to a plate 153 which is suitably attached to the bearing member 150. The reel 152 and notched wheel 151 are rotatable with respect to the shaft 158 but are non-rotatable with respect to each other. The reel 152 has in a recessed portion a spring 154, which biases it clockwise so as to provide for the restoration of the cord 102 in a manner later to be described. In this connection, the cord 102 cannot be unwound from the reel 152 while the rachet detent 155 is in its biased position. But the rachet detent 155 can be moved to a disengaged position by energization of the magnet 156 to actuate its armature 157 to a raised position.

The back plate 153 has attached thereto a hollow shaft 131 which extends to the inside of the mechanism such as to allow the cord to be properly fed to the reel 152. It also extends to the outside of the mechanism to provide for a stop against which the bead 133 can rest.

At the back of the panel 100 as viewed in Figs. 18 and 20, is a motor 160 which operates a variable ratio friction type gear 161 and through an idler 162 also operates another variable ratio gear 163. The gear 164 attached to the variable ratio friction gear 161 acts through an idler 165 to drive the gear 166 attached to a shaft for driving the cord reel 167. When this reel 167 is driven by the motor, it is driven in a clockwise direction as viewed in Fig. 18, which acts to wind up the cord 102 at a rate corresponding to the lapse of time. In other words, the motor 160 may be a synchronous motor suitably driven from a 60 cycle time adjusted source, so that with the proper gear reductions made in accordance with the length of the tape selected in accordance with the time scale for the holding loop, it will cause a one minute length of cord to be wound up on the reel 167 during the lapse of one minute of time. In other words, when the computer is set into operation by the controller, this motor 160 is set into operation to measure the stack loss time by accurately shortening the holding loop represented by the cord 102 to the proper length.

At the same time that the cord 102 is being wound on the reel 167 for stack loss time, the friction type variable ratio gear 163 is operated so that it acts through gear 168, idler gear 169 and gear 170 to operate the reel 171. This operation of the reel 171 acts to wind up a cord 172 that passes through the panel 100 over an idler pulley 173 and an eyelet 174 at the pivot point 106 to the percent wind mechanism 105 to which it is attached. In other words, the operation of the reel 171 by the motor 160 in a clockwise direction as viewed in Fig. 18 causes the per cent wind mechanism 105 to be moved against the bias of spring 113 toward the pivot point 106. The ratio of movement between the gears 161 and 163 can be varied by changing the position of the idler 162 which is effected by the screw thread adjustment of knob 175. When the knob 175 is in the position shown, the idler 162 is midway between the limits of its possible movement and represents a 1 to 1 ratio. This would represent a 100 per cent wind, which, of course, is not ordinarily expected to be encountered, but as knob 175 is moved downwardly, the percentage is gradually decreased until the idler 162 actually fails to contact the friction gear 163. This last position represents a zero per cent of wind, or a no wind condition. This variation in ratio is relatively gradual, except in the actual change between some small percentage and zero per cent, which condition can be suitably indicated on the scale.

The driving motor 160 and fire control magnets 149, 156, 180, 181 and 182 are controlled by circuits shown in detail in Fig. 22. These circuits and the operation of the computer will be presently discussed in detail, but the operation as a result of the energization of these magnets should first be noted from a structural standpoint.

The energization of the electromagnet 180 causes the idler gear 165 to be moved upwardly as viewed in Fig. 20. This disengages the gears 164 and 166 so that the reel 167 is free to rotate except for the friction brake 185 which provides only a limited amount of braking effect for the purpose of preventing over run of the reel during a restoration of the apparatus to its normal condition by the various biasing springs, as will be discussed later. The brake member 185 is pivoted at 186 and is held in a non-braking position by a spring 187. This spring 187 also acts to hold the idler gear 165 in position to engage the gears 164 and 166.

A similar arrangement is provided in connection with the electromagnet 181 which when energized causes the idler gear 169 to disengage the gears 168 and 170, and at the same time apply the friction brake 189 to the reel 171. This friction brake is controlled similarly as described for brake 185, in that it only applies a limited amount of friction for the purpose of merely retarding the rotation of the reel 171 at the end of an operation by the various biasing springs as described. However, the electromagnet 182 operates a spring biased armature 188 to an active position in which it is effective to positively lock the reel 171 in its then existing position by reason of a holding finger engaging notches on the side of the reel 171.

Referring to Fig. 20, it will be noted that a small crank arm 290 is mounted on the back of the panel 100, biased by spring 291 to the position illustrated. By pushing this crank arm 290 against the bias of spring 291, the gear 163 is caused to contact gear teeth on the side of gear 170 so that the reel can be manually positioned while the electromagnet 181 is energized causing the idler gear 169 to be actuated to a non-engaging position. This crank arm 290 is used for adjustment purposes, as will be later described.

Referring to Fig. 22 a push button PB1 which has a hold-magnet R1 associated therewith, is used to initiate the operation of the calculating organization; while the operation of a push button PB2 is used to designate when an airplane passes over the outer beacon OB of Fig. 6. A push button PB—R is employed for reset purposes as will be presently described.

The control circuit organization of Fig. 22 also includes relays R2 and R3 together with a thermal relay TH. The operation of the relays R3 causes the closure of front contact 212 for energizing a single stroke bell B and an indicator light LK.

It is believed that the characteristic features of this form of the present invention will be best understood by further description being set forth from the standpoint of operation.

*Operation secondary form*

Under the initial conditions, the flexible cord 102 assumes a position corresponding to the maximum holding loop for the particular wind conditions for which the slide W and the Q angle are then set. Let us assume that there is no wind, then the wind ratio setting mechanism 105 will be moved to a position on the lever 101 causing the read-out at W to indicate zero which is when the hollow shaft 131 is exactly over the pivot pin 106. This is effected by the crank 290 as later described. To hold the wind ratio mechanism 105 in such position, the stop 103 is also moved into position and the thumb nut tightened. With the wind ratio mechanism 105 in such position the particular position of the lever 101 is not important, but for the purposes of this discussion, it is assumed that the lever 101 is positioned at zero Q angle when there is no wind. Under these conditions, the cord holding mechanism will be biased to the right so as to hold the bead 190 against the back of the panel 100 while the spring 154 is holding the bead 133 against the end of the hollow shaft 131. As above mentioned, the spring 154 is substantially stronger than the biasing spring for holding the cord holding mechanism CHM. The cord 102 is thus held in a position representing the time and configuration of the maximum holding loop, since its length is selected in accordance with a suitable scale as described in connection with Fig. 1.

Assuming that there is no wind, the wind ratio setting knob 175 will be in a position representing zero wind. Also, the dial D will be set at the read-out R to the azimuth of the landing runway.

When an airplane in the holding stack is called out by the controller, the controller operates the push button PB1 in Fig. 22 which closes front contact 290 to energize the operating motor 160 with alternating current from a suitable source. As above mentioned, this motor is driven at a constant speed, being preferably of the synchronous motor type so as to accurately measure time. In series with the motor is a back contact 201 of a relay R3 and the primary winding 202 of a transformer 203.

The flow of current through the primary winding of the transformer 203 causes a current to flow in the secondary winding 204 which current is rectified by rectifier 205 and supplied to the winding of magnet R1. This electromagnet R1 acts to hold the push button contact 200 in an operated position so that a single actuation of the button PB1 by the operator is sufficient to initiate the operation of the motor 160 and cause its continued operation.

Referring to Fig. 20, it will be noted that the motor 160 will drive the variable ratio gear 161 but not the gear 163 because of the zero setting of the wind per cent knob 175. The operation of the motor thus drives the reel 167 at a rate to cause the proper amount of the cord 102 to be wound up on reel 167 in accordance with the passing increments of stack loss time. This causes the holding loop to be gradually made smaller with the passing of stack loss time. The cord holding mechanism CHM compensates for this by moving to the left against its biasing means including the pulley 123 (see pulley 33 of Figs. 2 and 4 and related descriptions for details).

When the airplane leaves the holding stack and passes the outer beacon OB (see Fig. 6), the pilot reports to the controller who then actuates the push button PB2 which energizes the upper winding of the relay R2. The picking up of the relay R2 closes front contact 206 completing a stick circuit through the lower winding of the relay R2 and including back contact 207 of relay R3.

As soon as the relay R2 picks up, it also closes its front contact 208 which energizes the electromagnets 181, 156, 182 and 140 in series. The energization of the clutch magnet 181 for the slide W performs no useful function at this time since the variable ratio friction gear 163 is not being driven at this time. The energization of the electromagnet 156 acts to release the ratchet wheel 151 and its associated reel 152, so that the continued operation of the reel 167 may draw cord 102 at a rate in accordance with the elapse of time. However, it should be noted that at this time the cord holding mechanism CHM is locked in position by reason of the energization of the electromagnet 140, so that the position of the cord holding mechanism CHM is not changed during this part of the operation.

It should be noted that the energization of the electromagnet 182, although it locks the reel 171 in its existing position, performs no useful function at this time, since the reel 171 is not being driven.

Since the cord 102 has been reduced in length equal to the stack loss time by the winding of the cord onto the reel 167 in accordance with the lapse of time, as soon as the pilot of the airplane reports passing over the outer beacon OB, the controller can read the azimuth of the out-time course from the dial D at the read-out P. This information is immediately communicated to the pilot of the airplane so that he can begin the out-time course of the holding loop at once. At the same time, the controller actuates the push button PB2, which energizes relay R2 (see Fig. 22).

The motor 160 continues operation so as to cause the cord 102 to be wound up on the reel 167 in accordance with the lapse of time. But because the cord holding mechanism CHM is locked by the electromagnet 140, the cord 102 begins to be unwound from the reel 152. This can be done because the ratchet 155 is released by magnet 156. This causes the bead 133 on the cord 102 to begin to travel toward the pulley 124. The time consumed by the bead 133 in travelling from the hollow shaft 131 to the point of tangency with the periphery of the pulley 124 represents the time of the out-time course of the holding loop. The slide 132 is also moved by the head 133 along the rod 130 to a point where it operates the contact spring 135 to make connection between the terminals 136 and 137 when the bead 133 reaches the point of tangency. Since the rate of travel of the bead 133 corresponds to the time scale for the flexible cord 102, the time which elapses following the actuation of the push button PB2 to the time that the contact 135 is closed, corresponds to the out-time.

The closure of contact 135 closes a circuit to pick up the relay R3 by energizing its upper winding. The picking up of this relay R3 closes front contact 209 to close a stick circuit for the relay R3 through its lower winding, a resistor 210 of the thermal relay TH and a contact 211 of the thermal relay. The opening of back contact 201 immediately deenergizes the motor 160 and stops its operation. The closure of front contact 212 of relay R3 closes a circuit for a bell B and a lamp LK. Thus, the termination of the out-time is both visually and audibly indicated to the controller who immediately advises the pilot of the airplane to begin the right-hand procedure turn. In this way, the mechanism automatically measures the stack loss time and the out-time for the controller.

The picking up of the relay R3 also closes front contact 213 to energize the electromagnet 180 to declutch the reel 167. The opening of the make-before-break back contact 214 deenergizes the electromagnetic lock 182 for the slide W as well as the electromagnetic lock 140 for the cord holding mechanism CHM. However, the closure of the make-before-break contact 214 completes a circuit for the magnets 156 and 181 through front contact 215 and resistor 216. These contacts 214 and 215 are so adjusted that there is no interruption in the energization of these magnets during the picking up of the relay R3. This maintains the locking detent 155 out of contact with the ratchet wheel 151 and also maintains the reel 171 declutched from the motor for the restoring operation.

With these conditions, the spring 154 winds up the cord 102 on the reel 152 until the bead 133 is again restored to normal position against the hollow shaft 131. This operation of course unwinds any cord on the reel 167 until the bead 190 contacts the rear side of the panel 100. The release of the brake 140 allows the cord holding mechanism CHM to tend to assume a right hand position to tighten up the cord 102. As previously mentioned, the bias of spring 154 is substantially stronger than the bias for cord holding mechanism CHM, so that the cord holding mechanism CHM is caused to assume a position in accordance with the maximum holding loop for no stack loss time under the conditions for which the computer is then set.

It should be noted that the picking up of the relay R3 opens back contact 207 included in the stick circuit of the lower winding of relay R2, which allows the relay R2 to be released to assume its normal deenergized condition.

After an interval of time measured by the heating time of the thermal relay TH which is sufficient for the computer to be restored to normal, the contact 211 opens and deenergizes the stick circuit for the relay R3 which releases and restores the electromagnets 156, 180, and 181 to normal deenergized positions.

It is noted that while the cord 102 is being restored to its original position, the magnet 180 keeps the reel 167 declutched from the motor 160 so as to readily allow such restoration, the friction brake 185 is provided in order to prevent the pulley 167 from overrunning by reason of stored momentum.

When there is a wind condition, the drift angle and Q angle are found in a manner previously described in connection with Fig. 9. The dial D is set at the azimuth of the runway plus or minus the drift angle in accordance with the description provided in connection with Fig. 1. The lever 101 is set at the proper Q angle either right or left in accordance with the direction of the wind. In other words, as soon as the direction and speed of the wind is known, the dial D and the Q angle may be directly set. Also, when the speed of the wind is known, its percentage is found with respect to the selected cruising speed for performing of the landing procedure. This percentage is used to set knob 175, and from the chart of Fig. 10 the setting of the scale W on the arm 101 is found for zero stack loss time for that percentage wind. When the setting for the percent wind mechanism 105 is determined from the chart, the thumb nut on the stop 103 is loosened and moved until the proper setting appears at the read-out W.

This is accompanied by the artificial energization of the electromagnet 181 by operation of push button PB—R to declutch the reel 171 after the resetting operation of stop 103 has been performed, so that by operating the hand crank 290 the reel 171 can be manually positioned to take up the slack, if any, in the cord 172. On the other hand, it may be that the setting operation for the slide 105 requires that it be moved outwardly along the lever 101 in which case merely the release of the reel 171 from its connection with the motor will allow the biasing spring 113 to draw out the necessary amount of the cord 172.

In this way all of the settings of the calculator in accordance with a particular existing wind condition are made prior to calling the airplane from the holding stack.

In the above description, no particular settings have been given for this secondary form of the computing organization, because it should readily be appreciated that the holding loop is formed in the same manner and with same scale relationships as described in connection with Fig. 1. This form of the invention gives the same solutions to the different problems to which it is subjected, as are given by the primary form of Fig. 1. This secondary form of the present invention is shown more particularly for the purpose of illustrating that the stack loss time can automatically be put into the computer and that the measurement of the out-time can be automatically effected.

Referring to Figs. 17 and 18, it will be noted that the setting of the wind slide 105 to the zero position at the read-out W, causes the maximum holding loop to be represented by the mechanism for no wind conditions. It is noted under these conditions that the length of the cord 102 would accordingly be proportional to the length of the actual holding loop assuming that the cord extended from the point 106 over the pulley 124 and back to the point 106. However, for convenience in the structure, the cord 102 is foreshortened and taken over the pulley 147 with a suitable bead 190 attached thereto at a point to determine that the pulley 124 assumes the same position as if the cord 102 were actually taken to the point 106. This shortening of the cord 102 does not in any way affect the proper calculation of the quantities involved.

In some cases, it may be desirable to have a different holding loop time, and this different time may be employed by merely positioning the bead 190 to a new position adding or subtracting the proper length of the cord 102 in accordance with the time constant scale employed. If it is desired to have the calculating organization adapted for use in connection with different holding loop times, the bead 190 may be so attached to the cord 102 as to be adjustable to different calibrated positions on the cord 102.

In the description of the invention in its different forms, consideration has been given more particularly to the calculating functions of the apparatus employed, but it should be definitely understood that the computer of the present invention is contemplated for use more particularly in the calculation of holding loops in connection with a landing procedure as previously described, and that these calculations and operations are for the purpose of landing airplanes at equally spaced time intervals regardless of their locations in the holding stack. For this reason when a calculator is used as disclosed in the secondary form, it may be necessary to employ several such computers. This is because any one computer is allotted to a particular airplane until that airplane has begun its procedure turn for the holding loop. If the airplanes are to be landed at relatively close time intervals, it might be that the second airplane should be started on its landing procedure before the first computer for the first airplane has completed its operation. In other words, it may mean that several computers of the type described may be required in an actual installation.

Mathematical résumé

The purpose of this portion of the specification is to show that the operation of the computer of the present invention is mathematically correct. For this reason, attention will be now specifically directed to the kinematical problem involved in a holding loop maneuver forming part of a landing procedure according to the principles of the present invention.

In performing the landing procedure, there are certain basic factors and instrumentations involved which may be enumerated as follows:

(1) The landing procedure, including the holding loop maneuver is performed at a constant speed relative to the body of air through which the airplane is passing as shown by an airspeed indicator on the airplane.

(2) The heading of the airplane is indicated by a compass of suitable type located on the airplane so that instructions received by the pilot as to the heading of the out-time course can be followed.

(3) The airplane is provided with suitable navigational equipment, such as an automatic direction finder, so that the airplane can follow the in-time course defined by the inner and outer radio beacons IB and OB respectively.

(4) The airplane is provided with a rate of turn indicator so that it can make the desired circling maneuvers, such as performing a procedure turn at 3° per second, or $\pi/60$ radians per second.

(5) The approach controller is provided with suitable timing means so as to be able to measure the stack loss time and also the out-time when it has been calculated.

(6) The approach controller is provided with a computer constructed in accordance with the principles of the present invention as above described.

(7) A suitable holding stack and holding loop pattern is selected to constitute the landing procedure as above described.

System of notation

For the purpose of expressing the various factors and terms of the problem, the following conventions and notations are employed:

$v$=Airplane speed with respect to the ground
$w$=Wind speed
$u$=The airspeed of the airplane
$T$=Total time required for landing procedure (includes the time from the call of the airplane from the holding stack until it passes the outer beacon on the inward course toward the runway)
$t_s$=Time which elapses between the call of the airplane and the time it passes the outer beacon OB (abbreviated: stack loss time)
$t$=Time duration of the complete holding loop
$t_1$=Time duration of the out-time course designated OT (out-time course with respect to the moving body of air)
$t_2$=Time duration of the in-time course designated IT (in-time course with respect to the moving body of air)
$p$=Number of radians through which the airplane turns per unit of time in the procedure turn. (Assumed to be $\pi$ radians per minute)
$Q$=The acute angle between the ground course on the approach to the runway and the reciprocal of the direction of the wind.
$c$=A constant factor with dimensions of speed (such as six inches per minute)
$e$=The acute angle between the out-time course and the reciprocal of the in-time course
$L$=Total length of actual path of the airplane in the holding loop
$L_1$=Total length of simulated path of airplane in construction
$D$=Total displacement of moving body of air in time $t$.

Special symbols (1) A small letter underlined is used to denote a vector having direction and magnitude, but a small letter without the underlining will denote only the magnitude of the vector.

(2) Small letter subscripts $i$ and $f$ will be used to characterize the terms as belonging to the out-time course and the in-time course respectively. For example, the vector term $u_i$ is referred to as the initial velocity of the airplane relative to the moving body of air (initial because it relates to the out-time flight). Also, the vector term $\bar{v}_f$ is referred to as the final velocity of the airplane relative to the ground (final because it relates to the in-time flight).

Statement of the problem

Given: A holding loop time $t$, the airspeed of the airplane $u$, the wind velocity $w$, and the direction only of the in-time course of the airplane $\bar{v}_f$, which is the direction of the axis of the runway course.

To find: The value of time $t_1$ of the out-time course and the direction of $\bar{u}_i$ conveniently termed the initial heading, which such related values that the time $t$ will be exactly consumed in the holding loop maneuver and so that the heading of the airplane, when it reaches the axis of the runway at the end of the procedure turn of the holding loop, will be such that the track of the airplane is parallel to and coincident with the axis of the runway course.

Solution

From the discussion of Fig. 6 given above, it will be appreciated that the total time $T$ for the landing procedure is suitably selected, one typical example being given as 5.696 minutes. Also, it is understood that the stack loss time is measured by the controller, and is thus a known quantity. Thus (1) $\quad t = T - t_s$ Fig. 23 shows certain relationships between the system of notation given above and the actual ground course of an airplane under the conditions shown and described with respect to Fig. 15.

Fig. 24 is a construction of the holding loop simulating the actual course of the airplane in a moving body of air and constructed in accordance with the principles of mathematical analysis and related to the ground course of Fig. 23.

Since the speed of the airplane relative to the body of air is assumed to be constant throughout the landing procedure as measured by the air speed indicator, the following equation is true:

(2) $\quad u = u_f = u_i$

The first step in solving the problem is to determine the direction of the vector $u_f$. This is readily done by constructing a velocity triangle in accordance with the vector equation:

(3) $\quad \overline{v_f} = \overline{u_f} + \overline{w}$

Referring to Fig. 23, the direction only of the vector $\overline{v_f}$, the length $u$ only of the vector $\overline{u_f}$, and both the direction and magnitude of the vector $\overline{w}$ are known. The standard construction for obtaining the direction of $\overline{u_f}$ under these conditions has been described above in connection with Fig. 9 and will not be discussed in detail at this time. By performing this construction, the complete vector $\overline{u_f}$ and the Q angle are to be regarded as known.

The presence of the wind causes the problem to become involved for two reasons:

(1) The track of the airplane with respect to ground during the procedure turn is not a true circle but is a segment of a trochoid.

(2) The ground speed of the airplane is a function of position along the loop. Thus, while the airplane speeds $v_i$ and $v_f$ are constant, they are not equal to each other; and along the procedure turn, the ground speed varies from point to point.

These difficulties are resolved at once by referring the motion of the airplane to a coordinate system moving with the air, instead of the coordinate system fixed with respect to the earth. Because the air speed $u$ of the airplane is held constant throughout the holding loop maneuver and the rate of turning in the procedure turn is held constant, the procedure turn referred to the moving coordinate system is a true circle with a radius of $u/p$ and the increments of length along the trajectory of the airplane are at every point strictly proportional to the increments of time.

Let us consider the wind condition which applies to Fig. 15. To an observer in a balloon which is over the outer beacon OB at precisely the time the airplane also passes over the outer beacon OB to execute the holding loop maneuver, it appears that the airplane has an initial velocity $u_i$ and that the outer beacon OB is also moving away from the balloon with a speed and direction represented by the vector $-\overline{w}$. The path of the airplane is so proportioned that after it makes a circular turn at the rate $p$ while traveling at the speed $u$ and then proceeds along the inbound straight away with a velocity of $u_f$, the observer in the balloon sees the airplane pass once more directly over the outer beacon OB which throughout the maneuver has been moving along a straight line with respect to the balloon with the velocity of $-\overline{w}$. In other words, the balloon which was over the outer beacon during the first passing of the airplane over the outer beacon is now a distance away from the outer beacon expressed by the following equation:

(5) $\quad D = wt$

In brief, the course of the airplane consists of two straight line segments and a circular portion with the straight lines being tangent to the circle and open at the other ends by a distance equal to the length D of the path of the balloon above described. The motion of the airplane with respect to the ground is as if the airplane were flying within a large box containing still air and its contents were being carried along over the ground with the velocity of the wind.

Let us now consider a miniature construction of the actual trajectory of the airplane relative to the moving body of air. The length L of the actual physical path of the airplane in the moving body of air is represented by:

(6) $\quad L = ut$

But since it is desired to construct the trajectory of the airplane on a reduced scale, let us choose a scale factor $c$ with the dimensions of speed so that the length $L_1$ of the construction of airplane path of Fig. 24 is represented by (7) $\quad L_1 = ct$ (8) Thus, $\quad L_1 = L(c/u)$ In fact, the ratio of any length in the construction to the corresponding length of the actual path is equal to $c/p$. For the purposes of the construction of the actual calculator or the figures of the drawings, any suitable value may be assumed for the factor $c$.

Referring to Fig. 24 choose a point OB and lay off to scale the displacement $-\overline{wt}$ of the moving body of air. This displacement D in the construction of Fig. 24 has a length $ct(w/u)$. Through the terminal point $OB^1$ of the vector $-\overline{wt}$ draw a line to the point F parallel to the vector $\overline{u_f}$ of Fig. 23. This gives the direction of the final air velocity of the airplane relative to the air for the in-time course of the holding loop.

The circular turn included in the maneuver has a radius given by the expression $u/p$ which is the ratio of the airspeed to the rate of turning. The radius of this circle to scale is therefore $c/p$. This circle must be drawn tangent to a line through $OB^1$ and parallel to the direction of $-\overline{u_i}$ with such a position that when a line is drawn tangent to the circle through the point OB, the total length of the line from OB to the point of tangency G, plus the length from G around the circle to F, and plus the length of the line from F to $OB^1$ equals the scale distance $ct$ which is proportional to the actual distance $ut$ travelled by the airplane during the total holding loop maneuver. When this condition concerning the length of the trajectory is met, the construction just described represents to scale, the path of the airplane relative to the moving body of air, and is related to the fixed coordinate system by the angle between the line from $OB^1$ to F and the line $u_f$ which corresponds to the drift angle determined from the velocity triangle.

With the path of the airplane thus reproduced to scale, the out-time $t_1$ can then be determined by measuring the distance between OB and G and making use of the scale relationship since this distance is equal to $ct_1$. The direction of the vector $u_1$ of Fig. 23, thus corresponds to the direction of the straight line OB to G of Fig. 24.

In the above description of the construction, it is assumed that the circle representing the turn is properly located so that the summation of the different segments of the holding loop equals the given holding loop time $t$, but in order to show that this circular turn may be located mathematically, as well as experimentally, analytical consideration of the construction of Fig. 24 will give the following equations:

(9) $$t = t_1 + \pi/p + e/p + t_2$$

(10) $$t_1 = \sqrt{(a-t_2)^2 + b(b-2/p)}$$

(11) $$e = \arctan \frac{(t_2-a)-(b-1/p)pt_1}{pt_1(t_2-a)+(b-1/p)}$$

where

(12) $$a = (w/u)t \cos Q$$
(13) $$b = (w/u)t \sin Q$$

The quantities $t$, $p$, $a$ and $b$ are known by reason of the relationships above explained. However, since there is no explicit expression for the term $t_1$ in terms of $t$, it is necessary to resort to trial and error methods of procedure to arrive at a solution. By experimental operations using a cord of length $ct$ and a disk of radius $c/p$, it is possible to obtain a relatively accurate set of tentative values which, when substituted in the equations, will serve to give a preliminary solution. A summation of the values for the different segments of the construction obtained from these Equations 9 through 13 will give a value either greater or smaller than the actual value of $t$. But by taking the difference between the preliminary solution and the prescribed value of $t$ and by using the derivative of $t_1$ with respect to $t$, it is possible to obtain a secondary solution more nearly approaching the prescribed value of $t$. By repeating this process, it is possible to arrive at the solution to the equations, by successive approximation. However, for practical purposes, the secondary solution is sufficient to give practical values to the unknown terms of the equations.

From the above analytical consideration of the holding loop employed in landing procedures, it is readily apparent that the present invention is mathematically sound and provides a convenient organization for quickly and accurately making the necessary calculations for a landing procedure, which calculations are readily available to the operator in the desired form necessary to issue instructions to the pilot of a landing airplane.

Having thus shown and described two computing organizations as specific in embodiments of the present invention, it is desired to be understood that these forms are selected to facilitate in the disclosure of the invention rather than to limit the number of forms which it may assume; and, it is to be further understood that various modifications, adaptations, and alterations may be applied to the specific forms shown to meet the requirements of practice, without in any manner departing from the spirit or scope of the present invention.

What I claim is:

1. In a computer for airplane maneuvers, means including a variable length flexible member shaped to simulate a variable length loop air course of an airplane, an air drift member associated with said means and acting on said flexible member to displace it in accordance with the air movement, an indicator acted upon by said flexible member and positioned relative to a dial calibrated in degrees, said dial being positioned to correlate the air course to the ground course, and means for varying the effective length of said flexible member in accordance with the time to be consumed by the airplane in said air course without varying the radius of the loop portion of said flexible member.

2. In a computer for landing maneuvers of a predetermined duration and including a holding loop having a procedure turn of specified time radius, said holding loop being of a length dependent upon the length of time consumed in a holding stack following the initiation of the landing maneuver before the holding loop is started, means including a wheel of a radius proportional to the radius of said procedure turn, a flexible member located about the circumference of said wheel and held in position to simulate said holding loop, the length of said flexible member being proportional to a predetermined time, means for shortening said flexible member to an extent proportional to the time said airplane loses in said holding stack between the initiation of a landing maneuver and the time it passes a specified point at which it starts said holding loop, and means for indicating the time an airplane must fly following the passage of said point until it reaches a point of tangency on said procedure turn by indicating the length of said flexible member between a point simulating said point and the point of tangency between said flexible member on said wheel since the flexible member has its length selected in accordance with said stack loss time.

3. In a computer for landing maneuvers of a predetermined duration including a variable stack loss time and a holding loop with a procedure turn of a known number of degrees per minute, in combination, a wheel of a diameter proportional to the diameter of said procedure turn expressed in units of time, a flexible member of a length proportional to the predetermined time of said landing maneuver and supported by said wheel, means for locating one end of said flexible member at a point corresponding to the point of initiation of the holding loop and for locating the other end at the point corresponding to the point of termination of the landing maneuver being calculated, means for shortening the length of said flexible member proportional to the stack loss time which elapses prior to the airplane entering said holding loop, and means for indicating the time represented by that portion of said flexible member extending between said point of initiation and the point where said flexible member becomes tangent to the circumference of said wheel.

4. In a computer for airplane maneuvers, a wheel having a diameter proportional to the diameter of a procedure turn of an airplane in a moving body of air, support means for said wheel allowing it to be moved along a line parallel to a line representing one leg of an air course which line is tangent to the periphery of said wheel, a flexible member of a length proportional to the length of said air course and having one end attached at a point along said one leg of the air course, said flexible member being supported at its intermediate portions by said wheel, and its other end being capable of being moved to different positions, and means for locating the other end along a line representing the direction of the wind with respect to the direction of said one leg of said course and at a distance therefrom proportional to the distance the body of air will move in the time that it will take an airplane to travel at a selected speed the actual air course simulated by said flexible member.

5. In a computer for computing the time an airplane must fly in a particular straight line direction in a holding loop of variable configuration if the time the airplane spent in a holding stack since it started a constant time maneuver and the time of flight of a semicircular of a turn at the end of such direction of flight are known comprising, a wheel of a diameter proportional to the time required to fly the diameter of said semi-circle, a flexible member of a length proportional to said constant time minus said stack loss time according to the same proportion and extending from a point and then around said wheel and back to said point, and means for measuring the length of time represented by that portion of said flexible member extending between said point and the point where said flexible member becomes tangent to said wheel.

6. In a computer for computing the direction with respect to a runway an airplane must fly in a straight line in a holding loop having a procedure turn for the airplane to terminate the turn at a point where the line of said runway is tangent to such turn when the holding loop is to be of such a length as to cause the airplane to consume a time equal to the difference between a fixed time and the time spent by the airplane in a holding stack after beginning a landing maneuver before beginning the holding loop comprising, a wheel of a diameter proportional to the time required to fly the procedure turn, a flexible member of a length proportional to the said fixed time minus the stack loss time according to the same proportion and extending from a point around said wheel and back to said point, and means for measuring the angle between the straight portions of said flexible member extending from said point around said wheel.

7. In a computer for computing the direction an airplane must fly in a straight line in a holding loop of variable configuration after leaving a holding stack when the time of the holding loop is known in order to have the holding loop terminate with a straight leg in line with a desired ground course, a wheel of a diameter proportional to the diameter of a procedure turn expressed in time, a flexible member of a length proportional to the total time of any landing maneuver and extending from a point around said wheel and back to said point, means for shortening said flexible member to an extent to cause the effective portion of said member to be proportional to the time the airplane must spend in said holding loop, and means for measuring the angle between the straight portions of said flexible member and the azimuth of the ground course the airplane is intended to fly.

8. In a computer for computing the time an airplane must fly in a particular direction in a holding loop of variable configuration if the time the airplane spent in a holding stack since it started a constant time maneuver and the time of flight of a procedure turn at the end of such particular direction of flight are known comprising, a wheel of a diameter proportional to the diameter of said procedure turn, a flexible member of a length proportional to said constant time according to the same proportion and extending from a point and then around said wheel back to said point, means for shortening said flexible member to an extent proportional to the time spent in said holding stack according to the same proportion, and means for measuring the length of that portion of said flexible member extending between said point and the point where said flexible member becomes tangent to the periphery of said wheel after said flexible member has been shortened by said means for shortening it.

9. In a computer for airplane maneuvers, a wheel of a diameter proportional to the diameter of a procedure turn of an airplane in a moving body of air, mounting means for said wheel allowing it to be moved along a line parallel to a line representing one leg of an air course which line is tangent to the periphery of said wheel, said wheel being biased toward one end of said line, a flexible member of a length proportional to the length of said air course and located around said wheel with one end positioned to correspond with said one leg of the air course, and its other end being capable of being moved to different position around a point on the line representing said one leg corresponding to both the beginning and finish of said air course, means for locating said other end of said flexible member along a line from said point representing the direction of the wind with respect to the direction of said one leg of said air course and at a distance from said point proportional to the distance said body of air will move during the time it takes an airplane to travel at a selected speed over the actual air course simulated by said flexible member, dial means representing the true azimuth of said one leg of the air course, means indicating on said dial means the azimuth of said other leg of said air course by means of the position of said flexible member simulating the other leg of said air course so that the azimuth of both straight legs of the air course is known.

10. In a computer for airplane maneuvers, a wind arm capable of being set to represent the direction of the wind, a circular member having a diameter proportional to the diameter of a procedure turn of an airplane in a body of air, a flexible member of a length proportional to the length of an air course and having one end positioned dependent upon the point of termination of the air course and having its other end positioned along said wind arm a distance from said point dependent upon the relative wind and plane speeds, whereby the actual air course is simulated by said flexible member, time measuring means operating for a time dependent upon the distance between said other end of said flexible member and the point where it becomes tangent to said wheel, and indicator means effective to give a distinctive indication when said time measuring means has completed its operation.

11. In a computer for airplane maneuvers, means for simulating the variable course of an airplane including at least one procedure turn, said means including a circular member having a radius proportional to the radius of said procedure turn and including a flexible member partially surrounding said circular member and of a length proportional to the length of said variable course, a dial calibrated in degrees and set in accordance with the azimuth of the final leg of said course, adjusting means for selecting the desired length of said course, and pointer means operated by said flexible member relative to said dial to give the azimuth of the initial leg of the air course to be followed by an airplane.

12. In a computer for airplane maneuvers, a flexible member of a length proportional to the distance an airplane is to fly in a moving body of air for a given maneuver, means including a circular member for causing said flexible member to assume a shape corresponding to an actual flight pattern having a procedure turn and straight courses tangent thereto, support means for the two ends of said flexible members for positioning said two ends relative to each other in accordance with the direction and distance of movement of the moving body of air for the time an airplane will take to fly the distance represented by the length of said flexible member, a moveable scale for indicating the direction of movement of said body of air with respect to the final straight course of said maneuver, and a pointer operated by said flexible member for indicating on said moveable scale the true azimuth of the initial course simulated by said flexible member.

13. In a computer for airplane maneuvers, a flexible member of a length proportional to the distance an airplane is to fly at a selected speed in a moving body of air for a given maneuver, adjustable mechanical means including a circular member and support means for causing said flexible member to assume a form corresponding to an actual flight pattern having a procedure turn with initial and final straight courses tangent thereto, one end of said flexible member having associated therewith a fixed point representing the termination of the final straight course of the given maneuver, the other end of said flexible member being positioned relative to said fixed point in accordance with the direction and distance of movement of the moving body of air for the time an airplane will take to fly the complete maneuver distance represented by said flexible member, an adjustable scale for indicating the direction of movement of said body of air with respect to the final straight course of said maneuver, and a pointer operated by said flexible member adjacent to said adjustable scale to indicate the azimuth of the initial straight course of said maneuver.

14. In a computer for airplane maneuvers including two straight courses tangent to a procedure turn, means for simulating the actual course of the airplane in a body of air including a circular member having a radius proportional to the radius of said procedure turn and having a flexible member of a length proportional to the length of both straight courses and that proportion of the procedure turn actually flown by the airplane, said flexible member being passed around said circular member and having its ends located relative to each other in accordance with the direction of the wind and its velocity being effective for the time for the particular airplane maneuver being calculated, a dial calibrated in degrees and located on the axis of said circular member and positioned to correlate the air course to the ground course by being set to represent the drift angle for any given condition or windage relative to the final straight leg of the course, and an indicator moved about said axis of said circular member in accordance with the position assumed by the initial portion of said flexible member to indicate the true azimuth of the initial straight course tangent to said procedure turn.

15. In a computer for airplane maneuvers, means including a flexible member having a length proportional to a course to be followed by an airplane, a circular member having a peripheral length proportional to a standard procedure turn and mounted to be rotatable, said flexible member being located around said circular member and movable with respect thereto for simulating a turn at different selected points in the air course of an airplane, means including a calibrated dial set in accordance with the drift angle of the airplane for orienting the air course to the actual ground course, and index means positioned by said flexible member relative to the calibrations of said dial to locate the azimuth of the air course.

16. In a computer for airplane maneuvers, a flexible member having a preselected length proportional to a course to be followed by an airplane, means including a circular member and a variable length rigid wind arm for positioning said flexible member in the form of a loop to simulate an air course of an airplane, said simulated air course taking the form of an open loop with respect to a moving body of air although the actual ground course forms a closed loop, setting means operable to orient said simulated air course with the actual ground course, and indicator means governed by said flexible member relative to said setting means to give the actual azimuth of one leg of the air course.

JOHN E. FREEHAFER.

REFERENCES CITED

The following references are of record in the file of this patent:

UNITED STATES PATENTS

| Number | Name | Date |
|---|---|---|
| 2,247,531 | Thurston | July 1, 1941 |
| 2,296,692 | Thurston | Sept. 22, 1942 |
| 2,408,357 | Wolfe | Sept. 24, 1946 |